(12) United States Patent
Loza et al.

(10) Patent No.: US 10,769,295 B2
(45) Date of Patent: Sep. 8, 2020

(54) JOIN OPERATIONS ON ENCRYPTED DATABASE TABLES

(71) Applicant: SAP SE, Walldorf (DE)

(72) Inventors: Nicolas Loza, Karlsruhe (DE); Florian Hahn, Karlsruhe (DE); Florian Kerschbaum, Karlsruhe (DE)

(73) Assignee: SAP SE, Walldorf (DE)

(*) Notice: Subject to any disclaimer, the term of this patent is extended or adjusted under 35 U.S.C. 154(b) by 296 days.

(21) Appl. No.: 15/874,698

(22) Filed: Jan. 18, 2018

(65) Prior Publication Data

US 2019/0220619 A1    Jul. 18, 2019

(51) Int. Cl.
| | |
|---|---|
| *G06F 21/62* | (2013.01) |
| *H04L 9/14* | (2006.01) |
| *G06F 21/60* | (2013.01) |
| *G06F 16/2455* | (2019.01) |

(52) U.S. Cl.
CPC ...... *G06F 21/6227* (2013.01); *G06F 16/2456* (2019.01); *G06F 21/602* (2013.01); *H04L 9/14* (2013.01)

(58) Field of Classification Search
CPC .............. G06F 21/6227; G06F 16/2456; G06F 21/602; H04L 9/14
See application file for complete search history.

(56) References Cited

U.S. PATENT DOCUMENTS 9,209,974 B1 * 12/2015 Akinyele .................. H04L 9/30
2009/0077378 A1 * 3/2009 Hacigumus ........... H04L 9/0894
713/165

2013/0191650 A1 * 7/2013 Balakrishnan ...... G06F 21/6227
713/190

(Continued)

OTHER PUBLICATIONS

Goldreich, et al. "How to Play Any Mental Game", Proceedings of Symposium on Theory of Computing, May 31-Jun. 2, 2009, pp. 218-229.

(Continued)

*Primary Examiner* — Kristine L Kincaid
*Assistant Examiner* — Zoha Piyadehghibi Tafaghodi
(74) *Attorney, Agent, or Firm* — Fountainhead Law Group P.C.

(57) ABSTRACT

Embodiments allow join operations to be performed upon encrypted database tables stored on an unsecure server (e.g., as part of a DBaaS offering), with reduced information leakage. Such secure join operations may be implemented through the combination of two cryptographic techniques: non-deterministic (randomized) searchable encryption; and attribute based encryption. The searchable encryption (e.g., Symmetric Searchable Encryption: SSE) allows join values to be revealed only for rows fulfilling additional predicate attributes that the client has filtered for, thereby offering fine granular security. The attribute based encryption (e.g., Key-Policy Attribute-Based Encryption: KP-ABE) avoids the unmanageable consumption of memory that would otherwise result from the creation of intermediate constructions on the server. Embodiments offer a solution reducing information leakage of join values not contained in the result of the actual database query. This results in fine granular security because join values of data rows not involved in the join computation, remain semantically secure.

20 Claims, 11 Drawing Sheets

(56) References Cited

U.S. PATENT DOCUMENTS

| | | | |
|---|---|---|---|
| 2016/0132692 A1* | 5/2016 | Kerschbaum | G06F 21/6227 713/189 |
| 2017/0235969 A1* | 8/2017 | Kamara | G06F 21/6227 713/159 |
| 2018/0157703 A1* | 6/2018 | Wang | H04L 9/14 |

OTHER PUBLICATIONS

Gentry C., et al. "Fully Homomorphic Encryption Using Ideal Lattices", Proceedings of Symposium on Theory of Computing, May 25-27, 1987, pp. 169-178.

Gentry C., et al. "Homomorphic Evaluation of the AES Circuit", Advances in Cryptology, Jan. 3, 2015, 35 pages.

Hacigumus, H., et al. "Providing Database as a Service" Proceedings of the 18th International Conference on Data Engineering, Feb. 26-Mar. 1, 2002, 10 pages.

Hacigumus, H., et al. "Executing SQL Over Encrypted Data in the Database-Service-Provider Model" Proceedings of be ACM SIGMOD Conference on Management of Data, Jun. 2-6, 2002, pp. 216-227.

Popa, R., et al. "CryptDB: Protecting Confidentiality With Encrypted Query Processing" in Proceedings of the Twenty-Third Symposium on Operating Systems Principles, Oct. 23-26, 2011, pp. 85-100.

Boldyreva, A., et al. "Order-Preserving Symmetric Encryption" in Proceedings of the 28th International Conference on Advances in Cryptology, Apr. 26-30, 2009, pp. 224-241.

Boldyreva, A., et al. "Order-Preserving Symmetric Encryption Revisited: Improved Security Analysis and Alternative Solutions" in Proceedings of the 28th International Conference on Advances in Cryptology, May 15-19, 2011, pp. 578-595.

F. Kerschbaum et al. "Optimal Average-Complexity Ideal-Security Ordre-Preserving Encryption" in Proceeding of the 21st ACM Conference on Computer and Communications Security, Nov. 3-7, 2014, 12 pages.

F. Kerschbaum "Frequency-Hiding Order-Preserving Encryption" in Proceeding of the 22nd ACM Conference on Computer and Communications Security, Oct. 12-16, 2015, 12 pages.

M. Bellare, et al. "Deterministic and Efficiently Searchable Encryption" in Proceeding of the 27th International conference on Advances in Cryptology, Aug. 19-23, 2007, 18 pages.

M. Naveed et al. "Inference Attacks on Property-Preserving Encryped Databases" in Proceeding of the 22nd ACM Conference on Computer and Communications Security, Oct. 12-16, 2015, 13 pages.

P. Grubbs et al. "Leakage-Abuse Attacks Against Order-Revealing Encryption" Cryptology ePrint Archive, www.eprint.acr.org/2016/895, 16 pages.

R. Curtmola et al. "Searchable Symmetric Encryption: Improved Definitions and Efficient Constructions" in Proceeding of the 13th ACM Conference on Computer and Communications Security, Oct. 30-Nov. 3, 2006, 10 pages.

S. Kamara, et al. "Dynamic Searchable Symmetric Encryption" in Proceeding of the 19th ACM Conference on Computer and Communications Security, Oct. 16-18, 2012, 12 pages.

D. Cash, et al. "Highly-Scalable Searchable Symmetric Encryption With Support for boolean Queries" Advances in Cryptology, Aug. 18-22, 2013, 45 pages.

D.S. Roche, et al. "Pope: Partial Order Preserving Encoding" in Proceeding of the 23rd ACM SIGSAC Conference on Computer and Communication Security, Oct. 24-28, 2016, 32 pages.

R.Agrawal, et al. "Sovereign Joins" in Proceedings of the 22nd International Conference on Data Engineering, Apr. 3-8, 2006, 12 pages.

A. Arasu, et al. "Oblivious Query Processing" via arXiv:1312.4012 [cs.DB], Dec. 14, 2013, 15 pages.

Y. Li, et al. "Privacy Preserving Joins" in IEEE 24th International Conference on Data Engineering, Apr. 7-12, 2008, 3 pages.

B. Carbunar, et al. "Toward Private Joins on Outsourced Data" IEEE Transactions on Knowledge and Data Engineering, Sep. 2012, 12 pages.

H. Pang, et al. "Privacy-Preserving Ad-Hoc Equi-Join on Outsourced Data", ACM Transactions on Database Systems, 2014, 41 pages.

M. Chase, et al. "Structured Encryption and Controlled Disclosure" in Proceedings of the 16th International Conference on the Theory and Application of Cryptology and Information Security, Dec. 5-9, 2010, 18 pages.

E.F. Codd "A Relational Model of Data for Large Shared Data Banks", Communications of the ACM, vol. 13, No. 6, Jun. 1970, 10 pages.

F. Kerschbaum, et al. "Optimal Re-Encryption Strategy for Joins in Encrypted Databases" in IFIP Annual conference on Data and Applications Security and Privacy, Mar. 18-20, 2013, 16 pages.

D. Boneh, et al. "Functional Encryption: Definitions and Challenges" in Proceedings of the 8th Conference on Theory of Cryptography, 2011, 21 pages.

Y. Wang, et al. "Probabilistic Public Key Encryption for Controlled Equijoin in Relational Databases", The Computer Journal, Oct. 2016, 13 pages.

S. Kamara, et al. "Parallel and Dynamic Searchable Symmetric Encryption", in Proceedings for the 17th International Conference on Financial Cryptography and Data Security, Apr. 1-5, 2013, 15 pages.

E. Stefanov, et al. "Practical Dynamic Searchable Encryption With Small Leakage", NDSS, vol. 14, Feb. 23-26, 2014, 15 pages.

M. Naveed, et al. "Dynamic Searchable Encryption Via Blind Storage" in Proceedings of the 35th Symposium on Security and Privacy, May 18-21, 2014, 16 pages.

D.X. Song, et al. "Practical Techniques for Searches on Encrypted Data", in Proceedings of the IEEE Symposium on Security and Privacy, May 14-17, 2000, 12 pages.

A. Sahai, et al. "Fuzzy Identity-Based Encryption", in Annual International Conference on the Theory and Applications of Cryptographic Techniques, May 22-26, 2005, 15 pages.

V. Goyal, et al. "Attribute-Based Encryption for fine-Grained Access Control of Encrypted Data" in Proceedings of the 13th ACM Conference on Computer and Communications Security, Oct. 30-Nov. 3, 2006, 10 pages.

J. Katz, et al."Predicate Encryption Supporting disjunctions, Polynomial Equations, and Inner Products" in Advances in Cryptology, Aug. 17-21, 2008, 17 pages.

S. Hohenberger, et al. "Attribute-Based Encryption With Fast Decryption" in Public-Key Cryptography, Feb. 26-Mar. 1, 2013, 16 pages.

A. Lewko, et al. "Decentralizing Attribute-Based Encryption" in Annual International Conference on the Theory and Applications of Cryptographic Techniques, May 2011, 21 pages.

Z. Liu, et al. "Efficient Generation of Linear Secret Sharing Scheme Matrices From Threshold Access Trees", IACR Cryptology ePrint Archive, Tech. Rep., Jun. 29, 2010, 28 pages.

A. Kiayias, et al. "Delegatable Pseudorandom Functions and Applications" in Proceedings of the 20th ACM Conference on Computer and communications Security, Nov. 4-8, 2013, 27 pages.

F. Hahn, et al."Searchable Encryption With Secure and Efficient Updates" in Proceeding of the 21st ACM Conference on Computer and Communications Security, Nov. 3-7, 2014, 11 pages.

R. Agrawal, et al. "Order Preserving Encryption for Numeric Data" in Proceedings of the ACM International Conference on Management of Data, Jun. 13-18, 2004, 12 pages.

O. Pandey, et al. "Property Preserving Symmetric Encryptions" in Annual International Conference on the Theory and Application of Cryptographic Techniques, Apr. 15-19, 2012, 17 pages.

www.Ciphercloud.com, 2017.

www.Vaultive.com, 2017.

R.A. Popa, et al. "Cryptographic Treatment of Cryptdb's Adjustable Join", downloaded from https://people.csail.mit.edu/nickolai/papers/popa-join-tr.pdf, dated Mar. 25, 2012, 14 pages.

M. Blaze, et al. "Divertible Protocols and Atomic Proxy Cryptography", in Advances in Cryptology-CRYPTO, Aug. 23-27, 1998, 18 pages.

R. Fagin, et al. "Comparing Information Without Leaking It", in Communications of the ACM, vol. 39, No. 5, May 1996, 19 pages.

(56) References Cited

OTHER PUBLICATIONS

M. Freedman, et al. "Efficient Private matching and Set Intersection" in Annual International Conference on the Theory and Applications of Cryptographic Techniques, May 2-6, 2004, 19 pages.
E. De Cristofaro, et al. "Linear-Complexity Private Set Intersection Protocols Secure in Malicious Model" in Proceedings of the 16th International Conference on the Theory and Application of Cryptology and Information Security, Dec. 5-9, 2010, 19 pages.
B. Pinkas, et al. "Scalable Private Set Intersection Based on OT Extension", Cryptology ePrint Archive, Sep. 26, 2016, 35 pages.
M. Yung "From Mental Poker to Core Business: Why and How to Deploy Secure computation Protocols?" in Proceeding of the 22nd ACM Conference on Computer and Communications Security, Oct. 12-16, 2015, 2 pages.
F. Kerschbaum "Outsourced Private Set Intersection Using Homomorphic Encryption" in Proceedings of the 27th Annual ACM Symposium on Applied Computing, Mar. 26-30, 2012, 10 pages.
F. Kerschbaum "Collusion-Resistant Outsourcing of Private Set Intersection" in Proceedings of the 27th Annual ACM Symposium on Applied Computing, Mar. 26-30, 2012, 6 pages.
D. Boneh, et al. "Public Key Encryption with Keyword Search" in Advances in Cryptology, Aug. 15-19, 2004, 15 pages.
D. Boneh, et al. "Conjunctive, Subset, and Range Queried on Encrypted Data" in Proceedings of the 4th theory of Cryptography Conference, February 21-24, 2007, 29 pages.
I. Demertzis, et al. "Practical Private Range Search Revisited" in Proceeding of the ACM SIGMOD Conference on Management of Data, Jun. 26-Jul. 1, 2016, 14 pages.
D. Cash, et al. "Dynamic Searchable Encryption in Very Large Databases: Data Structures and Implementation" in Proceedings of NDSS, vol. 14, Feb. 23-26, 2014, 16 pages.
S. Kamar, et al. "Boolean Searchable Symmetric Encrytion With Worst-Case Sub-Linear Complexity" in Annual International Conference on the Theory and Applications of Cryptographic Techniques, Apr. 30-May 4, 2017, 43 pages.
S. Faber, et al. "Rich Queries on Encrypted Data: Beyond Exact Matches" in European Symposium on Research in Computer Security, Sep. 21-25, 2015, 31 pages.
B. Fuller, et al. "Sok: Cryptographically Protected Database Search", arXiv Preprint arXiv, Mar. 6, 2017, 20 pages.
V. Attrapadung, et al. "Expressive Key-Policy Attribute-Based Encryption With constant-Size Ciphertexts" in International Workshop on Public key Cryptography, Mar. 6-9, 2011, 19 pages.

* cited by examiner

| Name | EmpId | B_Name(sseEnc:Dept) | B_EmpId(sseEnc:Dept) | B_{Name, EmpId}(sseEnc:Dept) |
|---|---|---|---|---|
| Harry | 3415 | B_Harry(SSE-Enc(Finance)) | B_{3415}(SSE-Enc(Finance)) | B_{Harry, 3415}(SSE-Enc(Finance)) |
| Sally | 2241 | B_Sally(SSE-Enc(Sales)) | B_{2241}(SSE-Enc(Sales)) | B_{Sally, 2241}(SSE-Enc(Sales)) |
| George | 3401 | B_George(SSE-Enc(Finance)) | B_{3401}(SSE-Enc(Finance)) | B_{George, 3401}(SSE-Enc(Finance)) |
| Peter | 2202 | B_Peter(SSE-Enc(Sales)) | B_{2202}(SSE-Enc(Sales)) | B_{Peter, 2202}(SSE-Enc(Sales)) |

FIG. 3

| B_Manager(sseToken:DName) | Manager |
|---|---|
| B_George(SSE-Token(Finance)) | George |
| B_Harriet(SSE-Token(Sales)) | Harriet |
| B_Harriet(SSE-Token(Marketing)) | Harriet |
| B_Charles(SSE-Token(Production)) | Charles |

FIG. 4

| Name | EmpId | ABE-Enc(sseEnc:Dept, Attributes={Name, EmpId}) |
|---|---|---|

FROM FIG. 6A

4) For $i = 1$ to $\hat{q}$ do:
   - Extract $AP_i \leftarrow ID_0[i].AP(\kappa_0^{j\alpha_i})$, $\alpha_i \leftarrow q_i.\alpha$
   - Set $t := \{\}$
   - $\forall id \in AP_i$:
     - If $A_0[id]$ is undefined: set $A_0[id] \xleftarrow{\$} \{0,1\}^{\lambda_0}$
     - $t := t \cup \{A_0[id]\}$
   - Set $X_0[i] \leftarrow \text{ABE-Key}(K_{ABE_0}, t)$
   - $\forall \alpha \in \alpha_i : \widetilde{T}_0[\alpha] := \widetilde{T}_0[\alpha] \cup t$ 5) Analogously to Step 4, generate ABE-keys from the leakage in $ID_1$ for table $\widetilde{C}_1$ using key $K_{ABE_1}$ and store them in $X_1$, while also filling table $\widetilde{T}_1$ and maintaining attribute consistency with table $A_1$.

6) Assuming that table $\widetilde{T}_0$ has $q_1$ attribute columns, execute $\forall i \in \{1, ..., n_0\}$:
   - Set $\widetilde{s}_i \leftarrow \widetilde{T}_0[i]$
   - If $|\widetilde{s}_i| < q_1$: add $q_1 - |\widetilde{s}_i|$ new random attribute strings to $\widetilde{s}_i$
   - $token_i \leftarrow \widetilde{C}_0[i]$
   - $\widetilde{C}_0[i] \leftarrow \text{ABE-Enc}(K_{ABE_0}, token_i, \widetilde{s}_i)$

TO FIG. 6C

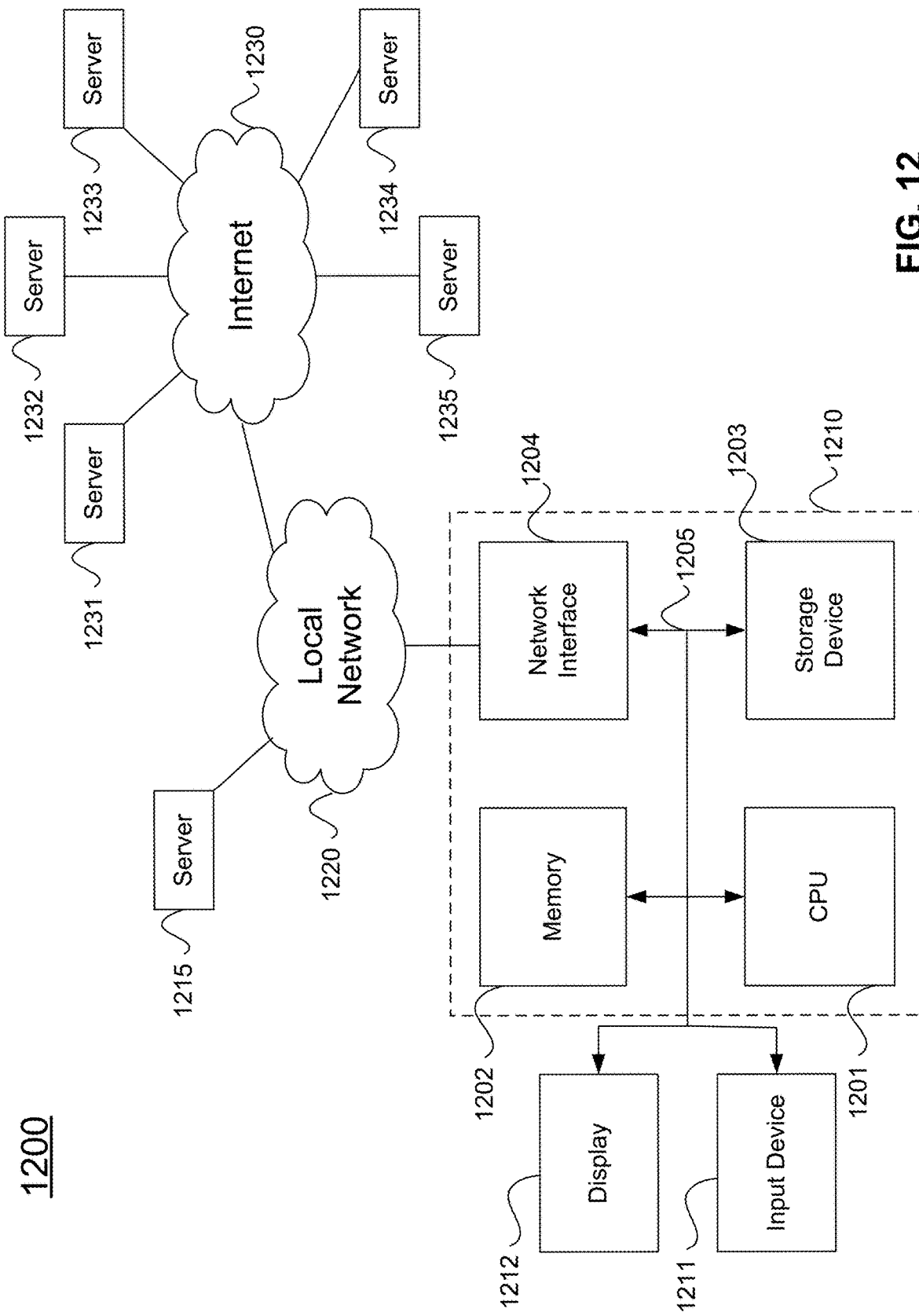

JOIN OPERATIONS ON ENCRYPTED DATABASE TABLES

BACKGROUND

Unless otherwise indicated herein, the approaches described in this section are not prior art to the claims in this application and are not admitted to be prior art by inclusion in this section.

The paradigm shift from on-premises computing, to cloud computing supported by an external provider, reduces costs to end users through externalization of storage, infrastructure, and database management. Along with these benefits, however, cloud computing also raises novel confidentiality risks for data outsourced to the external provider.

Specifically, by outsourcing sensitive data, the user is required to place trust in the service provider. While this security can be further enforced using cryptographic measures that prevent unauthorized attempts, such protection can interfere with or preclude entirely, the desirable manipulation of the stored data for analysis purposes.

For example, despite providing semantic security for the outsourced data, the application of common cryptographic techniques may render normal database computations (such as join operations) difficult or impossible to perform.

SUMMARY

Embodiments allow join operations to be performed upon encrypted database tables stored on an unsecure server (as part of a DBaaS offering), with reduced leakage of information. Such secure join operations may be implemented through the combination of two cryptographic techniques: non-deterministic (randomized) searchable encryption; and attribute based encryption. The searchable encryption (e.g., Symmetric Searchable Encryption: SSE) allows join values to be revealed only for rows fulfilling additional predicate attributes that the client has filtered for, thereby offering fine granular security. The attribute based encryption (e.g., Key-Policy Attribute-Based Encryption: KP-ABE) avoids the unmanageable consumption of memory that would otherwise result from the creation of intermediate constructions on the server. Embodiments offer a solution reducing information leakage of join values not contained in the result of the actual database query. This results in fine granular security because join values of data rows not involved in the join computation, remain semantically secure.

A computer-implemented method according to an embodiment comprises a server storing in a database, a first encrypted table and a second encrypted table encrypted according to a non-deterministic and searchable first encryption scheme. The server receives from a client, a join token based upon a query including a join operation and a predicate attribute constraint. An engine of the server searches the first encrypted table and the second encrypted table according to the join token to reveal an intermediate construction including only rows of the first encrypted table and the second encrypted table fulfilling the predicate attribute constraint, the intermediate construction encrypted according to a different encryption scheme. The server communicates to the client, the rows of the first encrypted table and the second encrypted table fulfilling the predicate attribute constraint.

A non-transitory computer readable storage medium embodies a computer program for performing a method comprising a server storing in an in-memory database, a first encrypted table and a second encrypted table encrypted according to a non-deterministic and searchable first encryption scheme. The server receives from a client, a join token based upon a query including a join operation and a predicate attribute constraint. An in-memory database engine of the server searches the first encrypted table and the second encrypted table according to the join token to reveal an intermediate construction including only rows of the first encrypted table and the second encrypted table fulfilling the predicate attribute constraint, the intermediate construction encrypted according to a different encryption scheme. The server communicates to the client, the rows of the first encrypted table and the second encrypted table fulfilling the predicate attribute constraint.

An embodiment of a computer system comprises one or more processors and a software program executable on said computer system. The software program is configured to cause an in-memory database engine to store in an in-memory database, a first encrypted table and a second encrypted table encrypted according to a non-deterministic and searchable first encryption scheme. The software program is further configured to cause the in-memory database to receive from a client, a join token based upon a query including a join operation and a predicate attribute constraint. The software program is also configured to cause the in-memory database engine to search the first encrypted table and the second encrypted table according to the join token to reveal an intermediate construction including only rows of the first encrypted table and the second encrypted table fulfilling the predicate attribute constraint, the intermediate construction encrypted according to a different encryption scheme. The software program is configured to cause the in-memory database engine to communicate to the client, the rows of the first encrypted table and the second encrypted table fulfilling the predicate attribute constraint.

In certain embodiments, the non-deterministic and searchable encryption scheme is randomized.

According to particular embodiments the non-deterministic and searchable encryption scheme comprises Symmetric Searchable Encryption (SSE).

In some embodiments the join token reflects the constraint expressed in a WHERE clause of the query.

According to various embodiments the another encryption scheme comprises attribute based encryption.

In particular embodiments the attribute based encryption comprises Key-Policy Attribute-Based Encryption (KP-ABE).

According to certain embodiments the first encrypted table and the second encrypted table are outsourced to the server from the client.

According to certain embodiments the first encrypted table and the second encrypted table are outsourced to the server from other than the client.

In various embodiments the database comprises an in-memory database, and the engine comprises an in-memory database engine.

The following detailed description and accompanying drawings provide a better understanding of the nature and advantages of embodiments.

BRIEF DESCRIPTION OF THE DRAWINGS

FIGS. 3-4 are tables showing SSE encrypted construction with additional blinding.

FIG. 5 is a table showing KP-ABE blinding.

FIGS. 6A-6C are flow diagrams illustrating a simulation according to an example.

FIG. 12 illustrates an example computer system.

DETAILED DESCRIPTION

Figure 1:
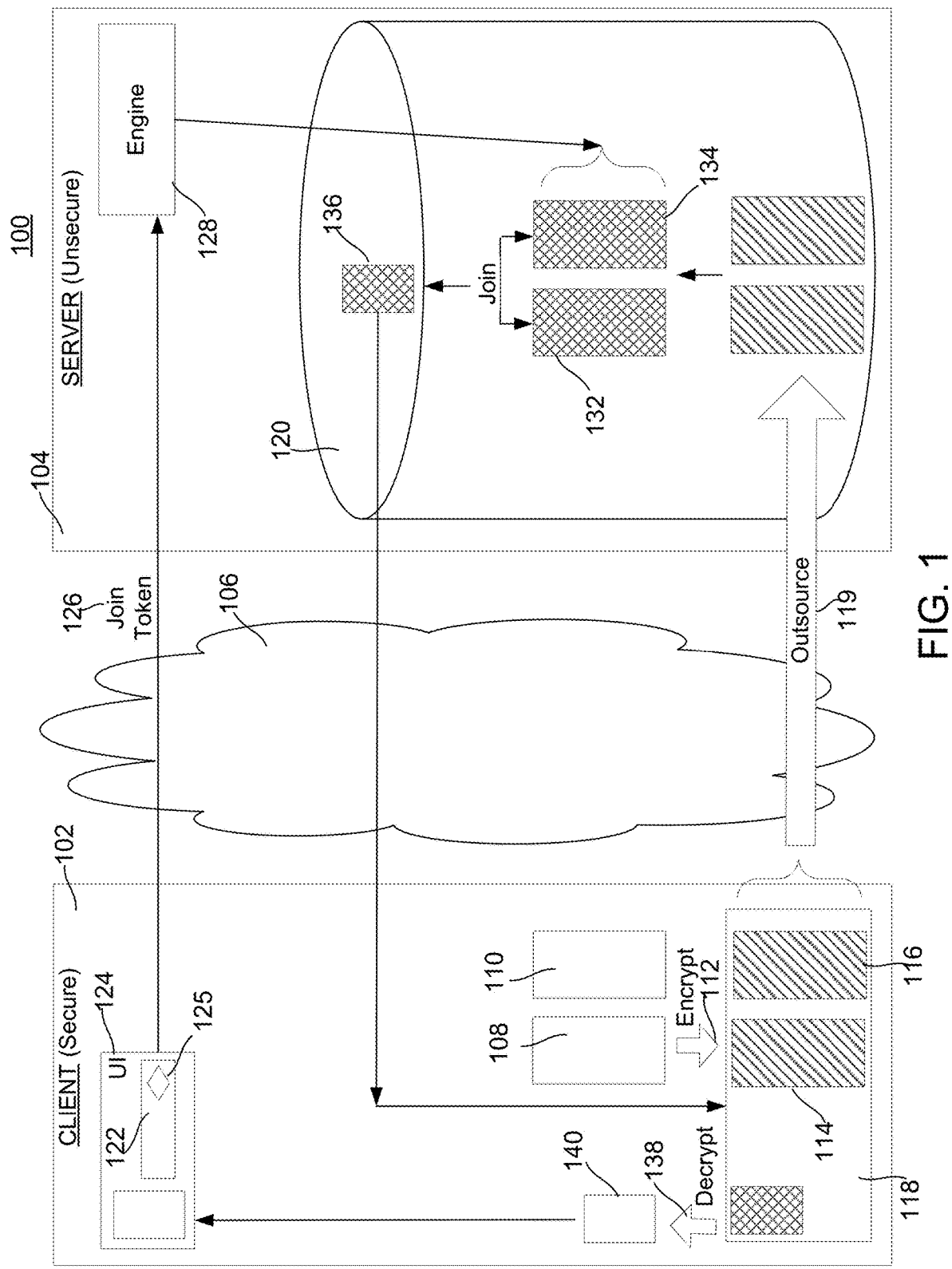
FIG. 1 shows a simplified diagram of a system according to an embodiment.

Described herein are methods and apparatuses performing encrypted database join operations. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

As a threshold matter, it is observed that many cloud-computing applications do not necessarily require the potential for general purpose computation. Rather, only a relatively small set of special operations may typically be performed on encrypted data. Common examples for such special operations include searching and aggregating data—as motivated by the recent emergence of the database-as-a-service (DBaaS) model.

This observation in turn allows for the design of alternate approaches balancing functionality for performance. In particular, conventional secure join functionality schemes tend to exhibit all-or-nothing security properties. That is, such secure join functionality tends to either hide the inner-join completely, or leak it completely.

For example, one conventional approach relies upon a join-token methodology. Given such a join-token approach, the database provider can reconstruct the complete inner-join of the encrypted tables, even though the result set actually of interest may be only a small subset of this inner-join, filtered by further predicate attributes.

In view of the rather limited, specialized operations that are typically intended to be performed upon encrypted data, embodiments offer a scheme allowing controlled equi-joins but avoiding the unnecessary leakage of the complete inner-join result. That is, embodiments provide a construction with finer granularity (especially after join executions) of the security provided for the encrypted database.

More particularly, embodiments allow join operations to be performed upon encrypted database tables stored on an unsecure server (e.g., as part of a DBaaS offering), with reduced leakage of information. Such secure join operations may be implemented through the combination of two cryptographic techniques: non-deterministic (randomized) searchable encryption; and attribute based encryption. The searchable encryption (e.g., Symmetric Searchable Encryption: SSE) allows join values to be revealed only for rows fulfilling additional predicate attributes that the client has filtered for, thereby offering fine granular security. The attribute based encryption (e.g., Key-Policy Attribute-Based Encryption: KP-ABE) avoids the unmanageable consumption of memory that would otherwise result from the creation of intermediate constructions on the server. Embodiments offer a solution reducing information leakage of join values not contained in the result of the actual database query. This results in fine granular security because join values of data rows not involved in the join computation, remain semantically secure.

A more formalized problem description is now presented. In order to decrease data redundancy and increase data consistency for data stored in relational databases, the process of database normalization is applied during the database design phase.

Embodiments support joins for tables in third normal form. That is, all tables contain only columns that are non-transitively dependent on the primary key.

This is achieved by splitting the table into two tables, where previously depended data is stored in its own separate table. The dependency is then modeled as primary key in the one table and foreign key in the second table, and can be reconstructed using the join operation in the data query (e.g., a SQL select statement containing a JOIN operator).

Assuming two tables $T_0$, $T_1$, the result of the equi-join operation on two join columns (one from $T_0$ and one from $T_1$) is the set of all combinations of rows from $T_0$, $T_1$ that contain equal values in their join columns. More formally, table $T_0$ has schema $(PK_{T0}, A_1, \ldots, A_l)$ with primary key $PK_{T0}$ and attributes $A_1, \ldots, A_l$. This table comprises $|T_0|$ records $(pk^1_{T0}; A^1_1, \ldots, A^1_l), \ldots, (pk^{|T0|}_{T0}, a^{|T0|}_1, \ldots a^{|T0|}_l)$.

Table $T_1$ has schema $(FK_{T0}, B_1, \ldots, B_m)$ with foreign key $FK_{T0}$ establishing the relationship to table $T_0$ and attributes $B_1 \ldots, B_m$. Table $T_1$ comprises $|T_1|$ records $(fk^1_{T0}, b^1_1, \ldots, b^1_m), \ldots, (fk^{|T0|}_{T0}, b^{|T0|}_1, \ldots, b^{|T0|}_m)$.

The following analysis uses the row number as row ID, e.g., the third row in $T_0$ has row ID 3 with primary key $pk^3$.

The equi-join with join attributes $PK_{T0}$ and $FK_{T0}$ is an operation with table $T_0$ and table $T_1$ as input and denoted as $T_0 \bowtie T_1$. The result of $T_0 \bowtie T_1$ has schema $(PK_{T0}, A_1, \ldots, A_l, B_1, \ldots, B_m)$ and comprises all records $(pk^i T_0, a^i_1, \ldots, a^i_l, b^j_1, \ldots, b^j_m)$ with matching keys $pk^i_{T0} = fk^j_{T0}$ for all $I \in [1, |T_0|], j \in [1, |T_1|]$.

Note, that the primary keys $pk^i_{T0}$ in table $T_0$ need to be unique, but each primary key maps to possible multiple foreign keys $fk^j_{T0}$. We assume further filtering based on additional filtering-predicates chosen from $\{A_1, \ldots, A_l\}$ and $\{B_1, \ldots, B_m\}$.

For example, consider the relations Employee and Dept as defined in Table 1 (below) with foreign key "DeptName", and Table 2 (below) with primary key "DName". We assume primary keys are unique values in the table, whereas foreign keys can occur multiple times in the table.

TABLE 1

| Employee | | |
|---|---|---|
| Name | EmpId | Dept |
| Harry | 3415 | Finance |
| Sally | 2241 | Sales |
| George | 3401 | Finance |
| Peter | 2202 | Sales |

TABLE 2

| Dept | |
|---|---|
| DName | Manager |
| Finance | George |
| Sales | Harriet |
| Marketing | Harriet |
| Production | Charles |

In SQL one instance for an equi-join query for supporting on encrypted databases with minimal information-leakage is:

SELECT*FROM Emp JOIN Dept ON Dept=DName
  WHERE Manager="Harriet" AND Name="Sally".

The corresponding result table is shown in Table 3 that is leaked to the service provider.

TABLE 3

| Employee ⋈ Dept WHERE Manager = "Harriet" AND DName = "Sally" | | | |
|---|---|---|---|
| Name | EmpId | DName | Manager |
| Sally | 2241 | Sales | Harriet |

Conventional approaches to performing join operations upon encrypted data may be based on deterministic encryption. That is, the same plaintext is encrypted to the same ciphertext such that $Enc^{Det}(x)=Enc^{Det}(y) \leftrightarrow x=y$.

This preserved property allows joins on such deterministically encrypted foreign and primary keys. However, it results in additional leakage. Thus in the example given immediately above, even though some tuples are encrypted and not part of the actual join result, they contain the same deterministically encrypted value for the "Dept" attribute—since this property is preserved by the application of deterministic encryption.

In the case of deterministic encryption for enabling joins, this leakage can be extracted even before the join operation is performed. It can be prevented with advanced techniques such as reencryption before the actual join. Nevertheless, following the join operation the encryption is deterministic under the same key.

Some conventional approaches may seek to initially hide this leakage by obfuscating the join columns (e.g., implemented using bloom filters). However, this obfuscation is lifted during the first join operation.

Conventional schemes seeking to provide secure join functionality tend to exhibit all-or-nothing security. That is, either the inner-join is hidden, or it is leaked completely.

By contrast, embodiments seek to reduce this additional leakage not directly derivable from the (even encrypted) result set the client has queried for. A result is fine granular security policy on the granularity level of the actual query answer, keeping non-matching datasets semantically secure.

FIG. 1 shows a simplified view of a system configured to implement resource analysis according to an embodiment. Specifically, system 100 comprises a secure client 102 that is in communication with an unsecure server 104 via network 106.

The client includes data in unencrypted form as tables 108 and 110. Utilizing an encryption process 112, the client transforms the tables into encrypted tables 114 and 116 within a secure space 118. As described in detail below, the encryption process utilizes a non-deterministic form of encryption, such as a randomized Symmetric Searchable Encryption (SSE) scheme.

The client then outsources 119 the encrypted tables across the network for storage in the server. In this manner the data becomes available in encrypted form to a variety of possible users having access to the server, which may be empowered to provide rapid access to large volumes of data in a database 120 (e.g., as part of a DBaaS offering).

Access to the encrypted data (e.g., for searching), is obtained as follows. A user inputs a query 122 to a user interface 124 of the client. The query comprises a join operation and predicate attribute 125 which the client seeks to filter for. That predicate attribute may be expressed as a constraint in the form of a WHERE clause.

Based upon the join query, the client references the secret space and generates a join token 126. The join token reflects the predicate attribute constraint as expressed in the original query. The join token is communicated across the network to the server, and in particular to engine 128 that is in communication with the database 120 in which the encrypted tables are stored.

In response to receiving the join token, the engine transforms the encrypted tables to intermediate constructions 132, 134. Specifically, these intermediate constructions limit the leakage of data by revealing only the join values for rows fulfilling the additional predicate attributes included within the query. Join values for rows not fulfilling that join constraint, are not revealed.

As is described below in connection with a strawman example, the generation of the intermediate constructions may be highly memory-intensive for the server. Accordingly, embodiments may reduce the consumption of memory by employing Key-Policy Attribute Based Encryption (KP-ABE) for the stored data of the encrypted join result 136.

Next, the encrypted join result is communicated back across the network to the client. The client references the secret space to perform decryption 138 of the query result 140, which may be displayed in the UI.

While the particular embodiment of FIG. 1 shows the engine of the server as being external to the database in which the encrypted data is stored, this is not required. According to certain embodiments the processing power available to an in-memory database engine may be leveraged to implement join operations upon encrypted table data. An example of such an in-memory database and database engine is the HANA in-memory database available from SAP SE of Walldorf, Germany.

And while the particular embodiment of FIG. 1 shows a same client as issued the join token, also performing the initial outsourcing of the encrypted tables to the server, this is also not required. In alternative embodiments, outsourcing of encrypted data could originate from a third party. That third party could also provide the client with sufficient information (e.g., ciphertext, keys) to allow its internal decryption of the secure query results returned from the server.

Figure 2:
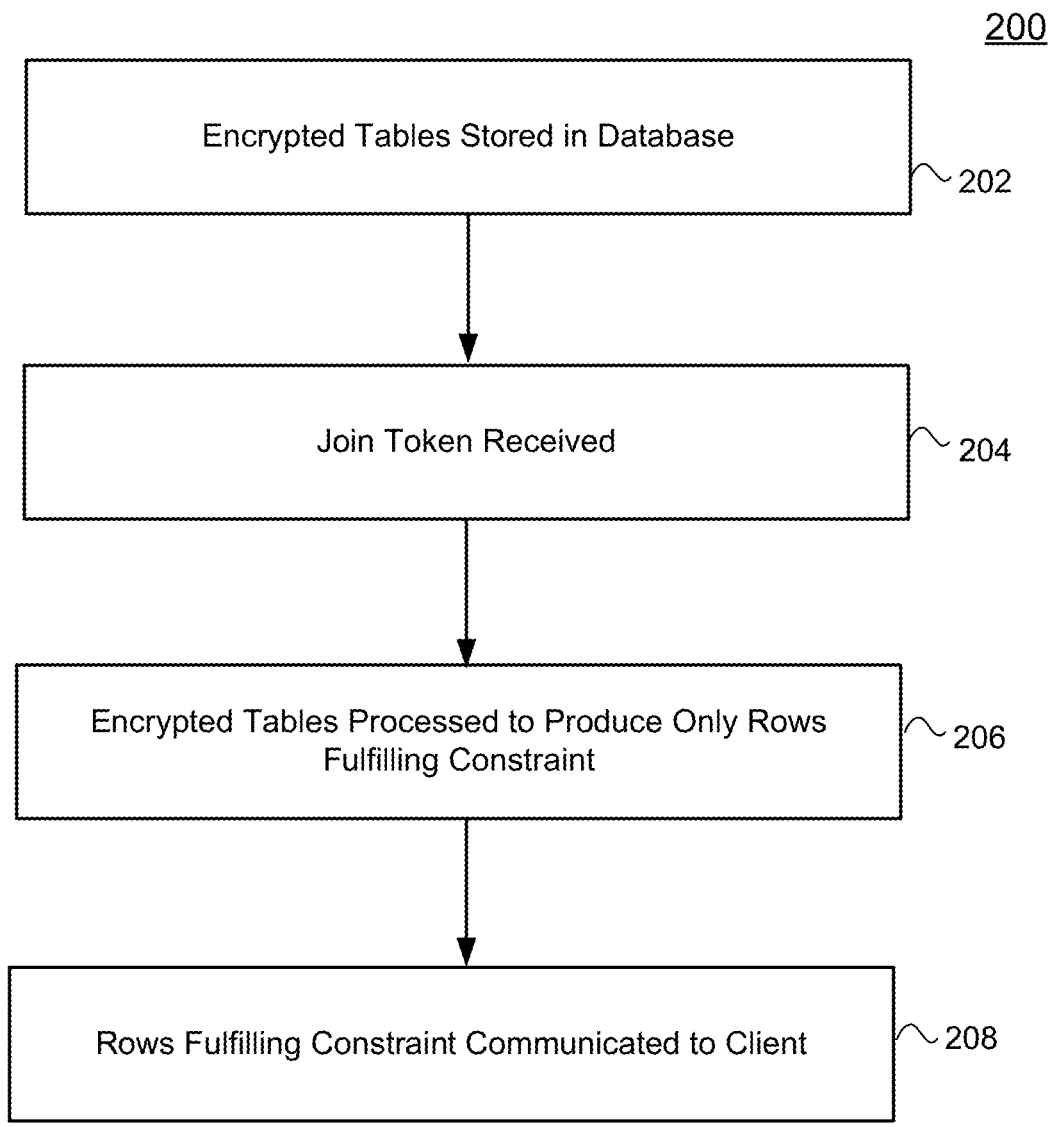
FIG. 2 shows a simplified flow diagram of a method according to an embodiment.

FIG. 2 is a flow diagram showing various actions taken in a method according to an embodiment. At 202, a server stores in a database, a first encrypted table and a second encrypted table that are encrypted according to a non-deterministic and searchable first encryption scheme.

At 204, the server receives from a client, a join token based upon a query including a join operation and a predicate attribute constraint. At 206 an engine of the server searches the first encrypted table and the second encrypted table according to the join token to reveal an intermediate construction including only rows of the first encrypted table and the second encrypted table fulfilling the predicate attribute constraint, the intermediate construction encrypted according to a different encryption scheme.

At 208 the server communicates to the client, the rows of the first encrypted table and the second encrypted table fulfilling the predicate attribute constraint.

One concrete illustration of the application of secure join operations according to embodiments, is now provided. In particular, the following example continues with the join operation previously described in connection with Tables 1-3 above.

Example

A solution according to an example may utilize two steps. First, a searchable symmetric encryption SSE scheme= (SSE-Enc; SSE-Token; SSE-Match) is applied. Second, an additional blinding on the search tokens and searchable encrypted ciphertexts is added.

It is noted that the instant embodiments focus upon supporting join operations, but do not consider protection for the additional columns. This is due to the availability of such protection with support on filtering encrypted data (e.g., searchable encryption).

Returning to Tables 1 and 2, the columns for which join operations are to be supported, are "Dept" and "DName". Here "DName" is a primary key of Table 2 and thus occurs exactly once in this column.

Accordingly, we apply the search token generation on values contained in column "Dept.DName". This yields deterministic search tokens (but with no harm on security since each value occurs exactly once).

Further, we apply SSE-Enc on values contained in column "Employee.Dept". This yields randomized ciphertexts, hiding multiple occurrences of the same plaintext value.

The intermediate result after searchable encryption and tokenization is depicted in Table 4 and Table 5 below.

TABLE 4

| Employee | | |
|---|---|---|
| Name | EmpId | sseEnc:Dept |
| Harry | 3415 | SSE-Enc(Finance) |
| Sally | 2241 | SSE-Enc(Sales) |
| George | 3401 | SSE-Enc(Finance) |
| Peter | 2202 | SSE-Enc(Sales) |

TABLE 5

| SSE Tokenized Intermediate Construction for Dept | |
|---|---|
| sseToken:DName | Manager |
| SSE-Token(Finance) | George |
| SSE-Token(Sales) | Harriet |
| SSE-Token(Marketing) | Harriet |
| SSE-Token(Production) | Charles |

Note that applying SSE-Enc on Table 4 hides the repeated occurrence of the "Finance" value in the Dept column, since the SSE encryption in row 1 yields a different ciphertext than the encryption of the same plaintext in row 3. However, in combination with access to corresponding search tokens stored in Table 5, a curious server can reconstruct the membership for these values by applying the SSE-Match.

For example, the curious server can use SSE-Token (Finance) and check for matches by iterating over the encrypted columns. By doing so the attacker learns that:
SSE-Match(SSE-Token(Finance), SSE-Enc(Finance))=1 for row 1, and
SSE-Match(SSE-Token(Finance), SSE-Enc(Finance))=1 for row 3,
concluding that both ciphertexts contain the same plaintext value.

The same argument is true for:
SSE-Match(SSE-Token(Sales), SSE-Enc(Sales))=1 for row 2, and
SSE-Match(SSE-Token(Sales), SSE-Enc(Sales))=1 for row 4.

Thus, we apply an additional blinding on the SSE encrypted values and the SSE tokenized values in a second step to prevent this attack. For this additional blinding, we exploit the observation that join queries usually are supplemented with additional constraints over (possibly even multiple) different additional columns. In SQL, such additional constraints may be expressed by the WHERE clause.

Hence it is not necessary to unveil all SSE tokens and SSE ciphertexts, but only the search tokens actually fulfilling the additional constraints. Consider again the query:
SELECT*FROM Emp JOIN Dept ON Dept=DName
    WHERE Manager="Harriet" AND Name="Sally".

From the beginning, the server gets a join token allowing him to unveil the blindings generated with Manager value "Harriet" and Name "Sally". Hence, the server learns the underlying SSE encrypted value SSE-Enc(Sales), as well as the SSE tokenized values SSE-Token(Sales) and SSE-Token (Marketing). However, the server does not learn, for example, SSE-Enc(Finance).

Applying the SSE-Match procedure (described below) then allows the server to learn which unblended rows contain the value:
(SSE-Match(SSE-Token(Sales), SSE-Enc(Finance))=0 but SSE-Match(SSE-Token(Sales), SSE-Enc(Sales))=1)
are equal, while hiding the other relations.

As described in detail later below, one possible (strawman) solution derives the blinding for each possible column combination separately. That is, for Table 4 the blinding is derived for the following columns:
Name,
EmpId, and
the combination of both columns (Name, EmpId).

An example for this structure is given in the tables shown in FIGS. 3-4, where $B_a$ denotes a blinding function derived for attributes a. In particular, FIG. 3 shows SSE encrypted construction with additional blinding for Employee. FIG. 4 shows SSE encrypted construction with additional blinding for dept.

Following this straightforward construction, the number of different applied blindings increases exponentially. Thus, for 2 additional constraint columns, $2^2-1=3$ different blindings are required. For 10 additional constraint columns, require $2^{10}-1=1023$ different blindings are required.

According to particular embodiments, this exponential increase can be addressed by applying KP-ABE. This decreases the storage blowup (depending on the specific KP-ABE scheme applied) as sketched in the table shown in FIG. 5.

Certain embodiments may apply a KP-ABE scheme decreasing the blowup to be linear and with fast decryption time. Thus for 10 additional constraints, the blinded value increases by factor 10. Different trade-offs toward smaller blowup but slower decryption time are possible as well. Further specifics regarding KP-ABE are provided below.

Details of a framework for conducting secure join operations according to particular embodiments are now discussed. The framework of a secure-join scheme with support of filtering predicates can be expressed as follows.

Definition 1 (Secure-Join Scheme): Let $T_0$ and $T_1$ be the tables to be encrypted and joined. A scheme (SecJoin) supporting secure joins with value blinding implements the following procedures.

MK←Setup($\lambda$). The setup procedure takes as input, a security parameter. It outputs the master key MK.

c←EncRow(MK, i, jv, s). The encrypt row procedure takes as input the master key MK, the indicator i indicating the type of join-value jv (i.e. jv is a foreign key if i=1, primary key otherwise) and the corresponding row attributes s. It outputs an encrypted join value c that is compatible with table $T_i$ and can be joined with table $T_{1-i}$.

$C_i$←EncTab(MK, $T_i$). The encrypt table procedure takes as input a table Ti and the master key MK. It runs EncRow for every row in $T_i$ and returns the collection of all resulting encrypted join values in form of an encrypted table $C_i$.

C=($C_0$, $C_1$)←EncDB(MK, D). This procedure encrypts each table in database D=($T_0$, $T_1$) using EncTab and returns the resulting encrypted database.

$\tau_{jq}$←GenToken(MK, jq). The token generation procedure takes the master key MK and a join query jq consisting of additional conditions on the attribute predicates for the tables in D, e.g. specified via a WHERE clause in SQL. It returns a join token $\tau_{jq}$ for the corresponding query.

$M_{T0 \to T1}$←Join($C_0$, $C_1$, $\tau_{jq}$). The join procedure takes as input the two encrypted tables $C_0$ and $C_1$, together with join token $\tau_{jq}$. The result is a map $M_{T0 \to T1}$, which maps row IDs in $T_0$ to their sets of matching row IDs in $T_1$.

Note that this scheme can be extended to support joins over multiple tables with the same foreign key column to be joined on, i.e., for all tables $T_j$ that contain the foreign key call EncRow with indicator i=1.

A simulation-based security proof is now described. In particular, this security proof for Symmetric Searchable Encryption quantifies the leakage of secure-join schemes.

Note that this leakage quantification is an upper bound. In the following we offer an intuition of the security proof for such leakage bounds.

From a technical point of view, we construct a simulator S for all procedures that require sensitive data as input. However, the simulator cannot access the actual sensitive data but only the result of leakage function L of that data.

Given such a simulator S we prove that any PPT adversary A is unable to distinguish whether he or she has been provided with true encryption values and join-tokens or simulations thereof. Following the framework given in Definition 1, S simulates encryption procedure EncRow and the procedure for join-tokens generation GenToken.

Note that the other operations with which the client can encrypt data (EncTab and EncDB) are based upon EncRow itself. Assuming there exists an adversary A that can successfully distinguish between true encryption values and their simulated version, this implies that the adversary has additional leakage that was not given to the simulator, which is a contradiction to the constructed simulator S. A more formal description of this idea is given in the following definition.

Definition 2: Let SecJoin=(Setup, EncRow, EncTab, EncDB, GenToken, Join) be a secure-join scheme, $\lambda \in \mathbb{N}$ be the security parameter. Consider the following probabilistic experiments with a stateful PPT attacker A, a stateful simulator S, and a stateful leakage function L.

Real$^{SecJoin}_A(\lambda)$. The challenger runs Setup($\lambda$) to get the master key MK. The adversary A generates a polynomial set of non-adaptive encryption requests $r_1, \ldots, r_q$ with r=(i, jv, s) and i$\in$\{0,1\}, with q=poly($\lambda$). Along with these, A also generates a polynomial set of non-adaptive join queries $jq_1, \ldots, jq_{\hat{q}}$, with $\hat{q}$=poly($\lambda$). A then sends ($\{r_1, \ldots, r_q\}$, $\{jq_1, \ldots, jq_{\hat{q}}\}$) to the challenger. For each encryption request, the challenger generates a ciphertext:

c←EncRow(MK, i, jv, s)

For each join query, the challenger generates $\tau_{jq}$←GenToken(MK, jq).

The challenger then returns all ciphertexts $c_1, \ldots, c_q$ and all join tokens $\tau_1, \ldots, \tau_{\hat{q}}$ to A. Finally, A returns a bit b that is the output of the experiment.

sim$^{SecJoin}_{A,S}(\lambda)$. The simulator sets up its internal environment. The adversary A generates a polynomial number of non-adaptive encryption requests, as well as a polynomial number of non-adaptive join queries, and sends them all to $S$.

For this complete non-adaptive query set, the simulator $S$ is provided with the corresponding leakage $\mathcal{L}$. Using this leakage, $S$ simulates and returns the appropriate ciphertexts $\tilde{c}$ or join tokens $\tilde{\tau_{jq}}$. Finally, A returns bit b that is the output of the experiment.

We say SecJoin is semantically $\mathcal{L}$-secure if for all polynomial-sized (in $\lambda$) non-adaptive adversaries A there exists a nonuniform polynomial-sized simulator $S$, so that the advantage of A is negligible in $\lambda$, defined as:

$$\|Pr[\text{Real}^{SecJoin}_A(\lambda)=1] - Pr[\text{Sim}^{SecJoin}_{A,S}(\lambda)=1]\| \leq \text{negl}(\lambda)$$

In order to benefit from all further progress achieved in both of the active research topics (attribute-based encryption, searchable symmetric encryption), we use these cryptographic tools as black boxes in our security proof. As a result, the information leakage we define for the security proof may be too pessimistic for some possible tools (in the sense that the quantified leakage is an over-estimation). Further, we aim for security against non-adaptive attackers due to our black box applications of attribute based encryption.

While it is relatively easy to construct efficient SSE systems that are secure even against adaptive attackers, the construction of ABE schemes that are secure against adaptive attackers is more challenging.

However, this flexibility in the choice of actual implementations of attribute-based encryption and searchable symmetric encryption results in several possible trade-offs between performance and information leakage. Depending on the offered properties of the tools actually implemented in our construction, the information leakage might be lower.

A strawman implementation of a framework increases security for databases with only one additional attribute column. That is, our construction does not provide the previously mentioned all-or-nothing security, but rather information-leakage on a finer granularity.

In this case, $T_0$ has schema ($PK_A$, $A_1$) and $T_1$ has Schema ($FK_A$, $B_1$) with join-attributes $PK_A$, $FK_A$ respectively, and a filter clause jq with exactly one filtering predicate a for attribute $A_1$ and one filtering predicate b for $B_1$. For this strawman construction we utilize deterministic encryption for protecting the join values.

However, in order to minimize the leakage of a secure-join scheme (SecJoin), we observe that it is sufficient to unveil the join result for all rows that match the additional filtering clause jq (i.e., having value a for column $A_1$ in $T_0$ and value b for column $B_1$ in $T_1$). Thus, instead of joining the complete tables $T_0$ and $T_1$ followed by a filtering on that join-result, we follow the orthogonal approach and run a privacy-preserving filtering on the complete tables $T_0$ and $T_1$, and perform the equi-join operation on that filtered result set. This is enforced by additional encapsulation of all join-values using a semantically secure encryption scheme (Enc, Dec) keyed with a secret key $k_a$ and $k_b$ derived from the attribute predicates that are used for additional filtering.

Further, we assume that the decryption procedure Dec indicates successful decryption. That is, decryption Dec(k', Enc(k,m)) is called successful if k'=k. This can be implemented by, e.g., concatenating the hash value h(m) to the encryption: Enc(k,m||h(m)) and checking this relation in the decryption procedure. Given a deterministic encryption scheme $\Pi^{Det}=(Gen^{Det}, Enc^{Det}, Dec^{Det})$, a semantically secure encryption scheme:
$\Pi$=(Enc,Dec) with keyspace K and a key derivation function KDF: $\{0,1\}^\lambda \times \{0,1\} \times \{0,1\}^* \to K$,
we can implement a secure-join scheme supporting one attribute per table according to the framework given in Definition 1 as follows:

MK←Setup($\lambda$). Output MK←$Gen^{Det}(1^\lambda)$.

c←EncRow(MK, i, jv, s). Sample $SK_s$←KDF(MK, i, s), encrypt jv under key $SK_s$ as Enc($SK_s$, $Enc^{Det}$(MK, jv)), and output the resulting ciphertext.

$C_i$←EncTab(MK, $T_i$). For every row in $T_i$ call EncRow and return $C_i=\{ErcRow(MK, i, k^j, s^j)\}_{j\in[1,|T_i|]}$.

C=($C_0$, $C_1$)←EncDB(MK,D). This procedure encrypts both tables in database D=($T_0$, $T_1$) using EncTab and returns the resulting ciphertext tables.

$\tau_{jq}$←GenToken(MK, jq). Note, that in this construction jq=(a; b) comprises two attributes, a for attribute $A_1$ and b for attribute $B_1$. Derivate the corresponding encapsulation keys $SK_0$←KDF(MK, 0, a), $SK_1$←KDF(MK, 1, b) and return join token $\tau_{jq}$=($SK_0$, $SK_1$) for the corresponding query.

$M_{T0 \to T1}$ Join($C_0$, $C_1$, $\tau_{jq}$). Parse token $\tau_{jq}$=($SK_0$, $SK_1$). For every encrypted join value $ej^j \in C_i$ use $SK_i$ for decrypting $Enc^{Det}$(MK, jv)=Dec($SK_i$, $ej^j$). For $pd^i=Enc^{Det}$(MK, jv) in $C_0$ that is decrypted successfully, create map entry $M[i]_{T0\to T1}\leftarrow\{j: fd^j=Enc^{Det}(Mk, jv)\in C_1$ with $fd^j=pd^i\}$. Finally, output the complete mapping $M_{T0\to T1}$.

One potential drawback to this strawman solution is that filtering is linear in the table size. That is, all rows must be decrypted and checked for a successful decryption.

This search overhead can be reduced by the application of a dynamic and efficient searchable symmetric encryption scheme based on inverted indexing. We emphasize that we assume the join values as sensitive data, hence we strive to minimize the leakage that can be extracted in regards to the secure-join operations and the underlying join-values.

However, we do not address the information leakage for the row attributes and the additional leakage induced by such inverted indexing techniques. This leakage has been studied and we assume that the secure application of such dynamic and efficient searchable symmetric encryption schemes resulting in more efficient pre-filtering step on the predicates. In the following discussion about secure joins we solely focus on protecting the join-values (i.e. both primary and foreign key) but do not consider the security of additional attribute predicates, nor do we handle the potential pre-filtering.

A second potential drawback of this strawman is the application of deterministic encryption for securing the join values has additional leakage that is no direct consequence of the join result. That is, all values that match the WHERE clause in table $T_1$ leak that they have the same foreign key fk, even if they are not part of the equi-join result, (e.g. because no matching primary key from table $T_0$ fulfills the WHERE clause). This allows the server to extract the result of a self-join, even though not queried explicitly by the client.

A third potential drawback of the strawman construction is that the required memory grows exponentially in the number of attributes for each table. In more detail, given table $T_0$ with schema (PK, $A_1$, ... $A_n$) and the possibility to filter for all n attributes, the protected join value must be blinded with all possible combinations of the n attributes resulting in 2n different keys $SK_i^j$ for $j\in[1, 2^n]$ and the resulting blinded encrypted join values for all $2^n$ different keys must be stored for each row in $T_0$. The analogous argument holds true for table $T_1$.

A particular implementation as now discussed, focuses upon the latter two drawbacks. Specifically, we identified different special cryptographic tools required to address these problems and achieve our goal to reduce the information-leakage induced by join operation on a finer granularity.

Those tools are described below. Putting these tools together we present a comprehensive description of our implementation fitting the framework for secure-joins as specified in Definition 1. We quantify an upper bound for the information-leakage induced by our implementation based on the security properties offered by the used tools, and prove this upper bound in the formal framework provided in Definition 2.

The following tools are used. Recall that we assume two different tables $T_0$, $T_1$ where the join values of $T_0$ are primary keys, hence they are unique. The join values of $T_1$ are foreign keys, hence they might occur several times.

As a result, the application of deterministic encryption $\Pi^{Det}$ for equality checks on encrypted data has no consequences on the security level of encrypted values contained in join column of $T_0$ however, weakens security for encrypted values contained in join column of $T_1$.

In order to minimize this security penalty while still providing the functionality of matching encrypted values for equality, we replace the deterministic encryption scheme with a searchable symmetric encryption scheme (SSE) revised in the following.

Definition 3 (SSE Scheme): A secure Searchable Symmetric Encryption scheme SSE is a tuple of four (possibly probabilistic) polynomial-time procedures:

K←SSE-Setup($\lambda$): is a probabilistic procedure that takes as input a security parameter and outputs a secret key K.

$c_w$←SSE-Enc(K, w): is a probabilistic procedure that takes as input a secret key K and a plaintext w. It outputs a (randomized) encryption of w denoted as $c_w$.

$t_w$←SSE-Token(K,w): is a deterministic procedure that takes as input a secret key K and a plaintext w. It outputs a (deterministic) search token $t_w$.

r←SSE-Match($c_w$, $t_w$): is a deterministic procedure that takes as input a ciphertext $c_w$ and a search token $t_{w'}$. It returns r=1 if w=w' with $c_w$←SSE-Enc(K, w) and $t_{w'}$←SSE-Token(K, w') using the same secret key K. Otherwise, this procedure returns r=0.

Note that the output of SSE-Enc is randomized even for the same input (i.e. the same key K and plaintext w), while the output of SSE-Token is deterministic. We denote both $c_w$ and $t_w$ as SSE-values in the following. In order to model the equi-join functionality for $T_0$ and $T_1$ using SSE, one encrypts all (unique) join-values of $T_0$ calling SSE-Token and all (probably non-unique) join-values of $T_1$ calling SSE-Enc. Here, the correct choice is significant for the security, since the application of SSE-Enc on the non-unique values hides the frequency due to its randomized output characteristics making self-joins on $T_1$ impossible.

We emphasize that, although $T_1$ on its own is semantically secure after applying SSE-Enc, all values that occur in $T_0$ as well have additional leakage due to the comparison functionality provided by SSE-Match. More formally, an honest-but-curious attacker can define sets:

$$\{j \in [1, |T_1|] : \exists i \in [1, |T_0|] \text{ with SSE-Match(SSE-Enc} (K, fk^j), \text{SSE-Token}(K, pk^i)) = 1\}$$

grouping randomized ciphertexts (or, in this case, their IDs) for the same underlying plaintext value. As a consequence, blinding the SSE-values (both SSE-ciphertexts and SSE-tokens) remains a vital security protection for the outsourced databases with support of secure-joins.

To address the strawman solution's memory issues, we introduce the concept of attribute-based encryption (ABE). This is an expansion of public key cryptography that allows the encryption and decryption of messages based on attributes assigned to the ciphertext during encryption time. It focuses on ascribing the ciphertext with a predicate $f(\bullet)$, which then needed to be satisfied by the user's credential for the decryption to be successful. This can be defined as Ciphertext-Policy Attribute-based Encryption (CP-ABE), while also defining its complementary: Key-Policy Attribute-based Encryption (KP-ABE).

In the latter, attributes are used to annotate ciphertexts, and formulas over these are assigned to keys generated by the user. The formulas must then be satisfied by the attributes in the ciphertext for the decryption to be successful.

In order to define the procedures for KP-ABE, we first need to define what an access structure is. Definition 4 (Access Structure): Let $P = \{P_1, \ldots, P_n\}$ be a set of parties. A collection:

$\mathbb{A} \subseteq^P$ is monotone if:

$$\forall B, C: B \in \mathbb{A} \wedge B \subseteq C \rightarrow C \in \mathbb{A}.$$

An access structure (respectively, monotone access structure) is a collection (resp., monotone collection) $\mathbb{A}$. of non-empty subsets of P, i.e:

$$\mathbb{A} \subseteq 2^P \setminus \{\emptyset\}.$$

The sets in $\mathbb{A}$. are called the authorized sets, and the sets not in $\mathbb{A}$ are called the unauthorized sets.

Using this, we can now define the procedures implemented by a KP-ABE scheme. Definition 5 (KP-ABE Scheme): Given a message space M and an access structure space G, we define a Key-Policy Attribute Based Encryption (KP-ABE) scheme as a tuple of the following (possibly probabilistic) polynomial-time procedures:

(PK, MK) ← ABE-Setup(λ, U): is a probabilistic procedure that takes as input a security parameter and a universe description U defining the set of allowed attributes in the system. It outputs the public parameters PK and the secret key MK.

CT ← ABE-Enc(PK, M, S): is a probabilistic procedure that takes as input the public parameters PK, a message M and a set of attributes S, and outputs a (randomized) ciphertext CT associated with the attribute set.

$SK_A$ ← ABE-Key(MK, A): is a probabilistic procedure that takes as input the master secret key MK and an access structure A, and outputs a (randomized) private key $SK_A$ associated with the attributes described by A.

M ← ABE-Dec($SK_A$, CT): is a deterministic procedure that takes as input a private key SKA associated with access structure A and a ciphertext CT associated with attribute set S and outputs the message M encrypted in CT iff. S satisfies A.

Note, that general KP-ABE schemes have no claims with respect to the security of the attribute set S used in ABE-Enc. Hence one can potentially extract information about the used attribute set from a given ciphertext generated under this set. However, we assume the attribute set as sensitive relying on the stronger security property for the KP-ABE schemes called attribute-hiding.

Further, in the standard definition of KP-ABE, it is specified using a finite attribute universe U. However, there are lines of work that propose implementations of KP-ABE with arbitrarily large attribute universes. Therefore we will omit the usage of U.

More importantly the access structures used to generate ABE-keys can be constructed from any boolean formula, as well as from boolean formulas with threshold gates. In our application, we will use ABE-keys to describe the restrictions placed upon a join query (e.g., the WHERE clause in a SQL query.) It is therefore possible to support arbitrary restrictions described as boolean formulas, since ABE supports them as well.

We emphasize that flexibility in the policy formulation can be utilized to allow range filtering with only logarithmic (in the value domain size) attribute blowup, e.g. a column stores values $v_i \in D$ that should be compatible with range queries in the WHERE clause in a SQL query.

For the expression of value $v_i \in D$ as attributes compatible with an ABE scheme assume a sorted binary tree over the intended value domain D, each leaf represents one possible value $d_i \in D$. The left child of each node represents the lower half and the right child represents the upper half of the domain represented by the parent node.

Further, all nodes, both inner nodes and leaf nodes, are labeled with unique values $l_j$. For example the root node represents the complete domain [0, |D|], its left child represents:

$$\left[0, \left\lceil \frac{|D|}{2} \right\rceil \right],$$

and its right child represents $$\left[\left\lceil \frac{|D|}{2} \right\rceil + 1, |D|\right].$$

The attribute set S representing value $v_i \in D$ is then the set of all labels from the root to the leaf representing vi in such constructed binary tree. Following this technique, the range query can be transformed to a disjunction of node labels covering the complete queried range.

For the sake of providing a brief and coherent security proof, however, our construction in the remainder of this work will focus only on conjunctions (i.e., formulas where all the specified restrictions must be fulfilled.) Thus, from now on we will write ABE-Key(MK, $\{s_1, \ldots, s_l\}$), referring to the access structure describing the conjunction of all values $s_1, \ldots, s_l$.

Depending on the construction of KPABE, the sizes of the ciphertexts produced by ABE-Enc and of the keys produced by ABE-Key can vary. Here, we focus on performant constructions which require only two pairings per decryption and none for encryption or key generation, and produces ciphertexts and keys whose sizes are linear in the number of attributes used for their generation.

A secure-join scheme according to embodiments. Recall that the strawman construction is based on blinding deterministic encryption of the join values. The keys applied for the blinding are derived from their corresponding attribute predicates with the two drawbacks, namely:

i) an honest-but-curious attacker can deduce a self-join on $T_1$ for all unblinded keys without being queried explicitly, and
ii) the procedure has an exponential memory-overhead in the number of attributes.

A particular implementation according to embodiments addresses both drawbacks, with the following approaches:
i) the functionality of equality checks provided by deterministic encryption is realized with SSE, thus rendering self-joins impossible, and
ii) we reduce the memory-overhead to be linear in the number of attributes by using KP-ABE.

With these solutions in mind, we are ready to present our main construction based on a searchable symmetric encryption scheme SSE=(SSE-Setup, SSE-Enc, SSE-Token, SSE-Match) (rf. Definition 3) and a key policy attribute-based encryption scheme (rf. Definition 5) ABE=(ABE-Setup, ABE-Enc, ABE-Key, ABE-Dec).

We implement secure joins as specified in Definition 1 as follows:

Setup($\lambda$). Let=($\lambda_0$, $\lambda_1$) be the security parameter. The setup procedure executes the following operations:

$$K_{SSE} \xleftarrow{\$} SSE\text{-}Setup(\lambda_0)$$

$$K_{ABE0} \xleftarrow{\$} ABE\text{-}Setup(\lambda_1)$$

$$K_{ABE1} \xleftarrow{\$} ABE\text{-}Setup(\lambda_1)$$

and returns MK=($K_{SSE}$, $K_{ABE0}$, $K_{ABE1}$).

EncRow(MK, i, jv, s)

$$sseVal \leftarrow \begin{cases} SSE\text{-}Token(K_{SSE}, jv) & \text{if } i = 0 \\ SSE\text{-}Enc(K_{SSE}, jv) & \text{if } i = 1 \end{cases}$$

$$e \xleftarrow{\$} ABE\text{-}Enc(abeKey_i, sseVal, s)$$

and returns c.

EncTab(MK, $T_i$): run EncRow for every row in $T_i$, the SSE-values encapsulated by the ABE-encryption in form of an encrypted table $C_i$.

EncDB(MK, D): encrypt each table in a database D=($T_0$, $T_i$) using Enc Tab and return the resulting encrypted tables C=($C_0$, $C_1$).

GenToken(MK, jq): let jq=($jq_0$, $jq_1$) be the attributes in the queries WHERE clause corresponding to columns in tables $T_0$ and $T_1$, respectively. This procedure computes:

$$SK_{jq_0} \leftarrow ABE\text{-}Key(K_{ABE0}, jq_0)$$

$$SK_{jq_1} \leftarrow ABE\text{-}Key(K_{ABE1}, jq_1)$$

and returns $\tau_{jq}$=($SK_{jq_0}$, $SK_{jq_1}$).

Join($C_0$, $C_1$, $\tau_{jq}$): parse $\tau_{jq}$=($SK_{jq_0}$, $SK_{jq_1}$) and remove the ABE blinding for all matching rows as follows:

$$toks = \{t^i \mid \exists\, encToken^i \in C_0 : t^i = ABE\text{-}Dec(SK_{jq_0}, encToken^i)\}$$

$$ciphs = \{c^j \mid \exists\, encCiph^j \in C_1 : c^j = ABE\text{-}Dec(SK_{jq_1}, encCiph^j)\}.$$

It is important to note that both toks and ciphs are sets. While toks contains unique values, ciphs may contain multiple SSE-ciphertexts for the same join-value. If either toks or ciphs is empty, then the equi-join result is empty, hence the procedure returns the empty set. Otherwise, define a map $M_{T0 \to T1}$ where for every $t_i$ search the matching ciphertexts, that is, $M[i]_{T_0 \to T_1} \leftarrow \{j: c^j \in ciphs \text{ with SSE-Match}(c^j, t^i)=1\}$
Finally, return $MT_0 \to T_1$.

Recall the assumption that table $T_0$ has its primary keys as join values, hence we can assume that the join column contains only unique values. In this construction, we assume concretely that such values are the ones in $T_0$'s join column, and thus we replace them with their corresponding SSE-tokens. The reasoning behind this is that SSE-ciphertexts are always randomized, and thus multiple encryptions of the same word cannot be recognized as such without a valid SSE-token.

This is not the case with SSE-tokens, since they are generated deterministically. Further, all join-values that cannot be contained in the result set for the join-query, due to not matching the WHERE clause, remain obfuscated by attribute based encryption.

We now define this leakage intuition more formally and prove this leakage definition as an upper bound for our scheme. A security proof is as follows.

Let (H) be the trace induced by the SSE-values revealed through the join queries. Following the methodology of SSE, we define the trace of such q-query-hi story as:

$$\tau(H) = \{|D_{id_1}|, \ldots, |D_{id_n}|, \alpha(H), \sigma(H)\},$$

where:
$D_{idj}$ is a document content protected by SSE,
n is the number of such documents,
$\alpha(H)$ is the access pattern matching queried keywords, and
$\sigma(H)$ is the search pattern identifying repeated keyword tokens.

The access pattern $\alpha(H)$ comprises sets:

$$D(w_i) = \{id_j : \forall j \in [0,n] \text{ and } w_i \in D_{id_j}\}$$

containing the documents matching the keyword $w_i$ that has been searched for in query i. The search pattern $\sigma(H)$ indicates, whether two arbitrary searches were performed for the same keyword or not (i.e., whether the search token has been created for the same key word).

We re-interpret the scenario of SSE handling encrypted documents to our scenario handling exactly one encrypted join value per table row, resulting in $|D_{id_j}|=1$ for all j. Furthermore, $D(w_i)$ in $\alpha(H)$ will contain the identifiers of those rows whose join values match exactly the value wi. Finally, the search pattern is empty, since we assume SSE-tokenization for unique primary keys, thus avoiding multiple occurrences of the same SSE-tokens.

In order to define the total leakage of our scheme, assume that a join query can be split as jq=($k_0$, $k_1$), where $k_0$ and $k_1$ represent the restrictions placed in jq regarding tables $T_0$ and $T_1$, respectively. Furthermore, for a set of restrictions k= $\{a_1, \ldots, a_n\}$, we define the set AP(k)=$\{ID(a_1), \ldots, ID(a_n)\}$, which we call attribute pattern, containing the identifiers of all restrictions placed in k. Thus, if two join queries $jq_i$ and $jq_j$ have their restrictions on table $T_0$ $k^{jqi}_0$ and $k^{jqj}_0$ such that there exists some:

$$a \in k_0^{jqi} \cap k_0^{jqj},$$

then ID(a) will be present both in $AP(k^{jq^i}{}_0)$ as well as in $AP(k^{jq^j}{}_0)$.

Using definitions from above, let $ID_0$ and $ID_1$ be the information leaked through the join queries regarding tables $T_0$ and $T_1$, respectively. More specifically, for every id $id_{jq}$ for join query jq, $ID_0$ maps said id to the tuple $(AP(k^{jq}{}_0), \alpha_{jq})$, where $\alpha_{jq}=\alpha_1, \ldots, \alpha_l$ is the set of row IDs from table $T_0$ matched by the restrictions in jq, i.e in $k^{jq}{}_0$. $ID_1$ is similarly constructed, referring to columns and row IDs in table $T_1$.

We will now proceed to show how to (non-adaptively) simulate a set of encryption requests and join queries given the following leakage:

$$\mathcal{L}_{(r_1, \ldots, r_q, jq_1, \ldots, jq_{\hat{q}})} = (\tau(H), ID_0, ID_1)$$

The environment is set up as follows. Given $\lambda = (\lambda_0, \lambda_1)$, the simulator $\mathcal{S}$ initializes:

Empty tables $\widetilde{C_0}$ and $\widetilde{C_1}$, which will map row IDs to the encrypted values. These are returned as simulated versions of the encrypted tables.

Empty sets $X_0$, $X_1$ and $\tilde{X}$, which will contain ABEkeys ($X_0$ and $X_1$) and join tokens $\tilde{X}$. The latter will be returned as the set of simulated join tokens.

Empty tables $\widetilde{T_0}$, $\widetilde{T_1}$, which map row IDs to sets of query IDs.

Empty tables $A_0$ and $A_1$, which map attribute IDs to bitstrings.

Initialize $K_{SSE} \leftarrow$ SSE-Setup$(\lambda_0)$.

Initialize $K_{ABE0} \leftarrow$ ABE-Setup$(\lambda_1)$ and KABE1 $\leftarrow$ ABE-Setup$(\lambda_1)$.

Simulation is now discussed. Given the leakage from above, $\mathcal{S}$ proceeds according to the flow diagrams shown in FIGS. 6A-6C.

Figure 6A:
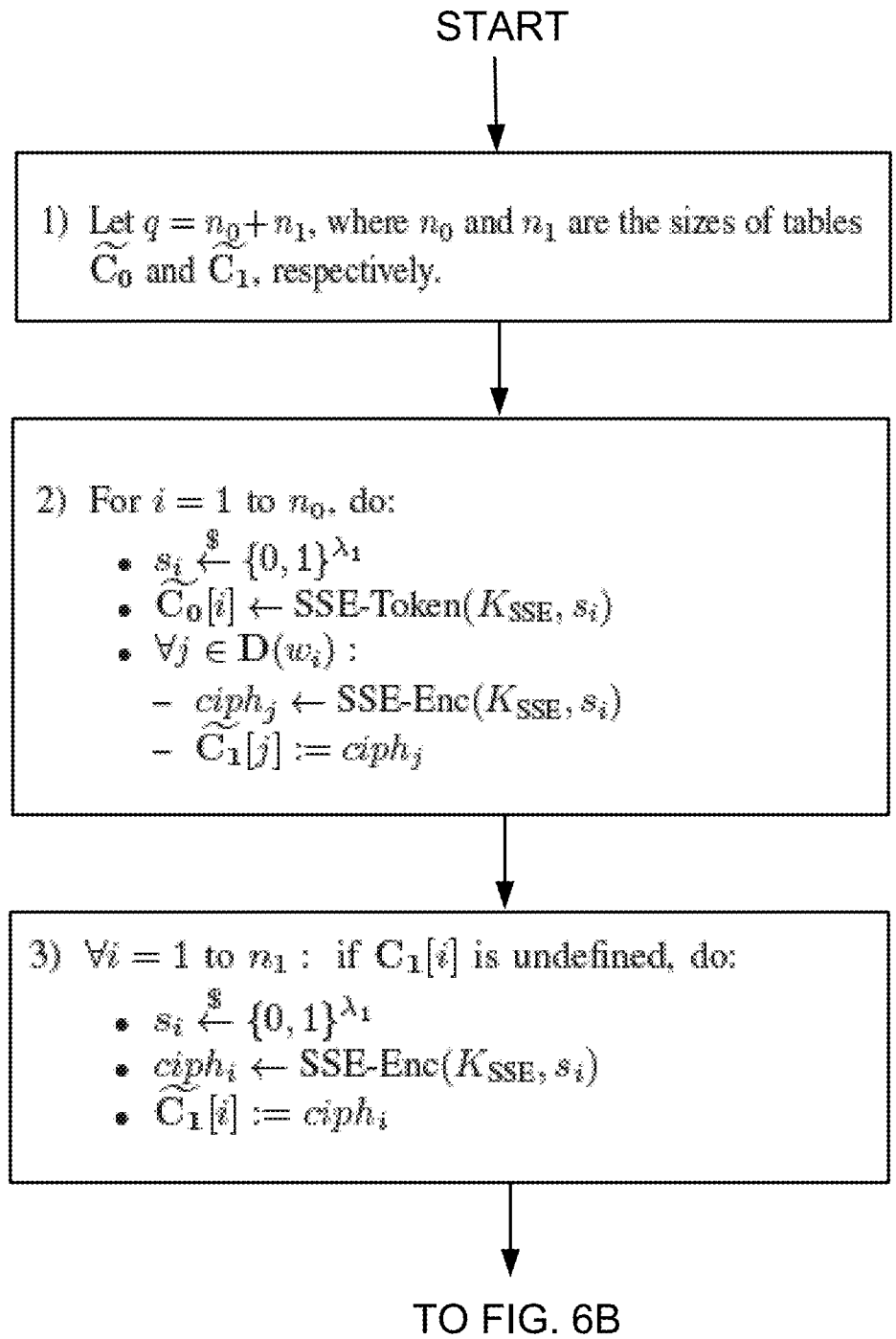

Specifically in steps 2) and 3) of FIG. 6A, all rows that match (at least) one join-query are filled with random values that match the characteristics leaked by the SSE leakage. This is not distinguishable by any attacker due to the SSE security.

In Step 4) and 5) of FIG. 6B, $\mathcal{S}$ creates attribute predicates that are consistent with the join queries and their attribute patterns. That is, the values are added to the correct columns and the corresponding rows share the same attributes. Further, ABE-keys are created for such fake predicates forming the simulated join-tokens. This is not distinguishable by any attacker due to the provided ABE security for ABE-keys.

Figure 6C:
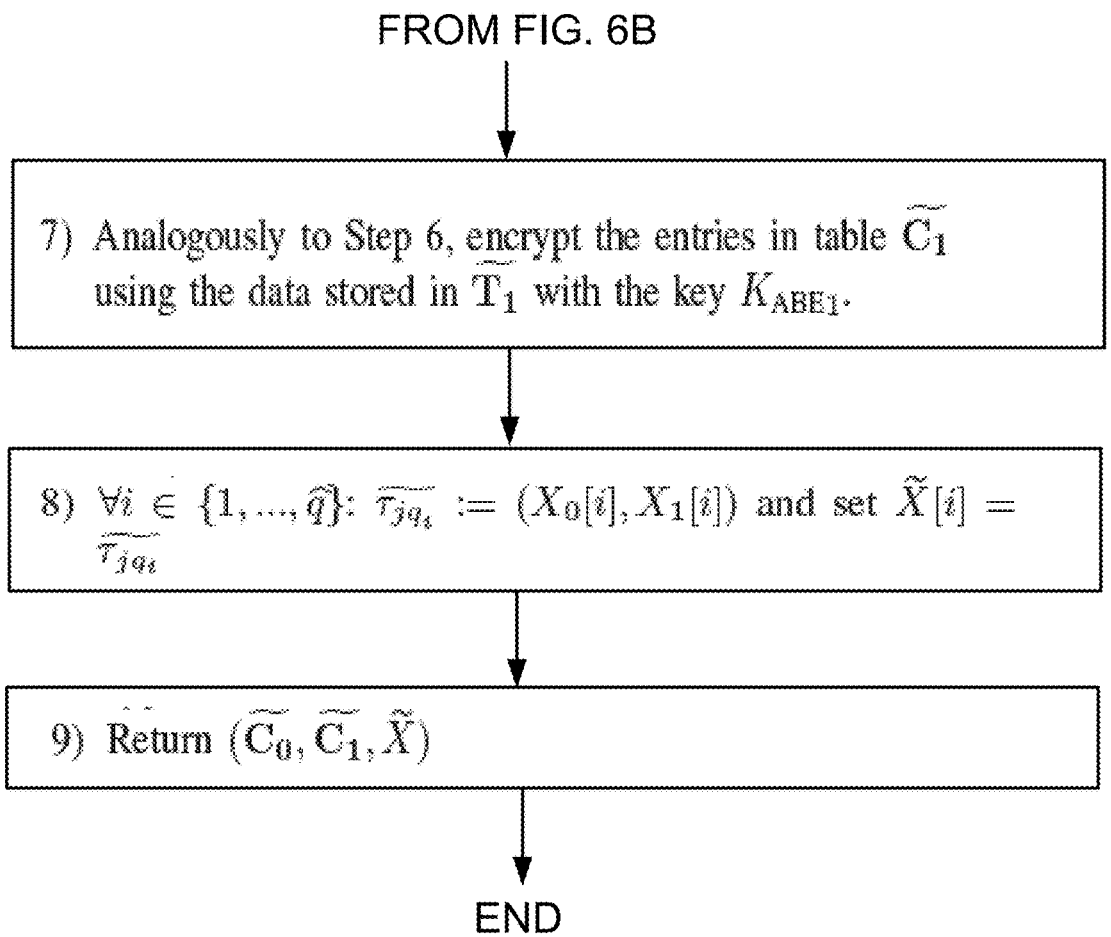

In Steps 6) and 7) of FIG. 6C, the simulator ABE-encrypts the two simulated tables with values that are consistent with the queries, as generated in the previous step, while also filling remaining empty attribute predicate cells with random values (i.e. all values that contain attributes matching no join-query). This is not distinguishable by any attacker due to the provided ABE security for ciphertexts.

Various details of implementing encrypted database join operations according to particular embodiments, are now discussed in connection with the following example.

Example

In this example, we provide an insight into the practical usage of our secure-joins scheme. In order to do so, we implemented a prototype of our scheme, and tested its efficiency under three different aspects:
encryption,
query parsing, and
long-term performance.

Regarding performance of the encryption step, this computation has to be executed on a trusted environment, converting the sensitive data to be outsourced into a cryptographically protected version preserving the functionality of joins.

Regarding query parsing, we measure the computational effort needed to transform a set of restrictions into an ABE-key. Recall, that this transformation is necessary in order to delegate the join computation without unveiling the complete join relation of the data encrypted and outsourced before. Our evaluation results allow us to assert that most modern personal (even mobile) devices are able to handle such operations in reasonable amounts of time, hence rendering join-token generation on the client-side realistic.

Finally, regarding long-term performance, we measure the actual join execution time preformed in the untrusted environment. Initially completely obfuscated by the encryption step of our scheme, entries are gradually ABE-decrypted with every passing join query. The results of the latter test show that the performance impact of ABE lessens with time, and that queries with similar result sets tend to have decreasing cryptographic overhead, reducing the join computation time.

The following experiments were implemented in Java 8. All operations, i.e. client and server, were executed on a machine with 32 64-bit Intel Xeon E5-2670 @2.60 GHz, with 240 GiB RAM and running SUSE Linux Enterprise Server 11. In the operations involving a client and a server, the latter used a MySQL Server 5.7 instance for storage of the encrypted data. All tables were defined using the InnoDB storage engine.

Moreover, this particular implementation makes use of the following libraries:

Scapi for all "classical" cryptographic primitives (e.g. AES, SHA-X, HMAC, PRFs, etc), jPBC for all group and pairing-based operations.

Both libraries are available as Java native code.

As the SSE scheme we used a variation without the inverted index, where each "file" is a join value. As PRF for the scheme we used a CBC-MAC-based PRF with AES as building block. As KP-ABE scheme we used one of PBC's symmetric Type A pairings over a group with a 160-bit-long prime number of elements, and a CBC-MAC-based PRF as the hash function necessary for the support of large universes. Moreover, in order to ascertain whether the decryption of an ABE-ciphertext was successful, we used MAC-then-encrypt with SHA-256 as MAC function.

Details regarding encryption results are now discussed. In order to test the efficiency and scalability of our SSE and ABE implementations, we generated random sets of rows, with different number of attribute columns, ranging from 3 to 20.

Then, we proceeded to SSE-encrypt every row's join value, followed by ABE-encryption of the resulting ciphertext with the other row values as attributes. We chose to SSE-encrypt and not tokenize, since the encryption already contains the generation of a corresponding token.

Thus, SSE-encryption must be slower than the tokenization. This way, we have a "worst-case" situation, although it must be noted that, unlike ABE, SSE-operations are all symmetric, and thus require minimal computational effort.

Figure 7:
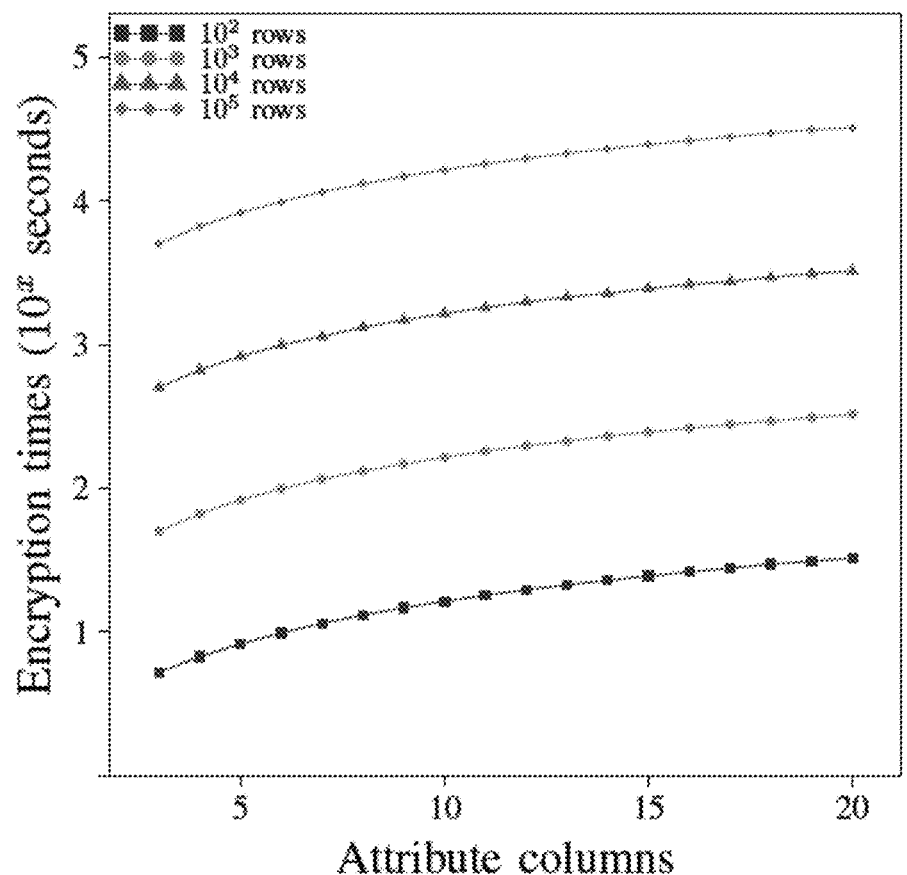
FIG. 7 plots encryption times with varying rows and attribute columns according to an example.

The results of executing these tests can be seen in FIG. 7, which plots encryption times with varying rows and attribute columns. It is evident that the performance of the encryption is linearly correlated with both the number of attribute columns ascribed to every ABE-ciphertext as well as with the number of rows to be encrypted.

It is worth noting that these tests were executed purely and sequentially in Java, and only take into account the computational effort for the client to execute the necessary SSE and ABE operations. They do not include any transmission costs or I/O overhead, which would be observed when submitting the encrypted data to a (SQL) server. As such, it can be interpreted as the computational effort invested by a client into the encryption of a join column before outsourcing it. The complete process can also be parallelized.

Details regarding key generation performance results are now discussed. Once the client has finished encrypting the database rows and outsourcing them, she can proceed to request from the server the data resulting from a join operation. In order to do so, the specified query's WHERE clause is parsed into two ABE-keys, which are sent to the server, who can use them to compute the requested join.

Figure 8:
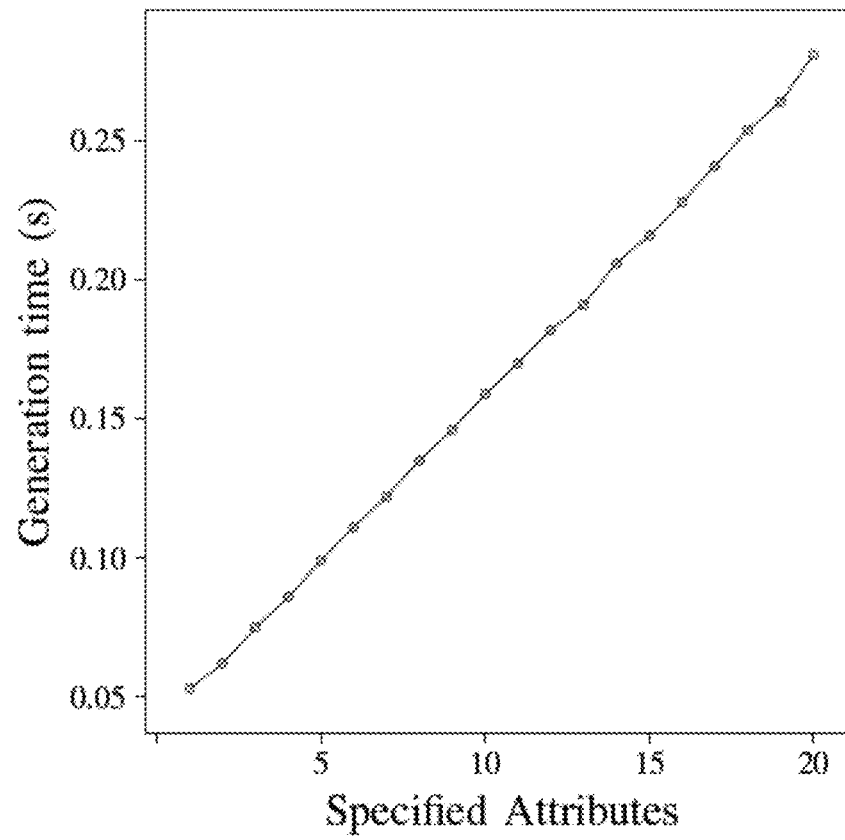
FIG. 8 plots ABE-key generation times with varying attribute restrictions according to an example.

In an independent test, with synthetically generated data, we measured the performance of generating a single ABE-key with varying number of restrictions (i.e. attributes). The results are presented in FIG. 8, which plots ABE-key generation times with varying attribute restrictions.

From these, we can gather that the key generation does not pose a serious challenge to any modern processor and can thus be successfully computed within a reasonable amount of time. Furthermore, this effort scales well, since it is linear in the number of conditions placed by the client in the WHERE clause.

Details regarding trace evaluation performance results are now discussed. For this section, we used data produced by the TPC Benchmark H. Using this benchmark's data generator with a scaling factor of 0:1, we took the table PART (20,000 rows and 6 attribute columns) with its primary key P PARTKEY and the table LINEITEM (600,000 rows and 8 attribute columns) with the foreign key L PARTKEY as our test tables.

After encrypting them with our Secure-Joins scheme, a random trace of join executions was generated. Iterating over said trace, the client parsed each join query into the corresponding join-token and sent them to the server (running our protocol in Java, storing the databases in MySQL). Given this join-token, the secure join operation was computed and evaluated as discussed in the following.

In our tests we assume the server is able to quickly identify the rows satisfying the WHERE clause (e.g., through the usage of a Searchable Encryption scheme), and thus proceeds to ABE-decrypt them if necessary, and compare the underlying SSE-values. In this particular implementation, we took advantage of the 32 processors available in the test machine and parallelized internally each join query (this is not to be confused with parallel execution of multiple join queries).

This internal parallelization was done in such a way that first, the (Java) server retrieved all rows from the (MySQL) tables $T_0$ and $T_1$ matching the corresponding restrictions placed in the WHERE clause. Once retrieved, all ABE-values where decrypted in parallel.

Then, a "full join" was built between all matching rows of both tables, and the resulting set of rows was evenly distributed among the available threads. Each thread then proceeded to compute a "local" result set, which was then returned to the main thread once the computation was finished, so that all local results could be combined in a global result set.

Finally, all values that needed ABE-decrypting were replaced with their underlying SSE-values in the corresponding MySQL tables. The result set of the join operation was then returned to the client.

Figure 9:
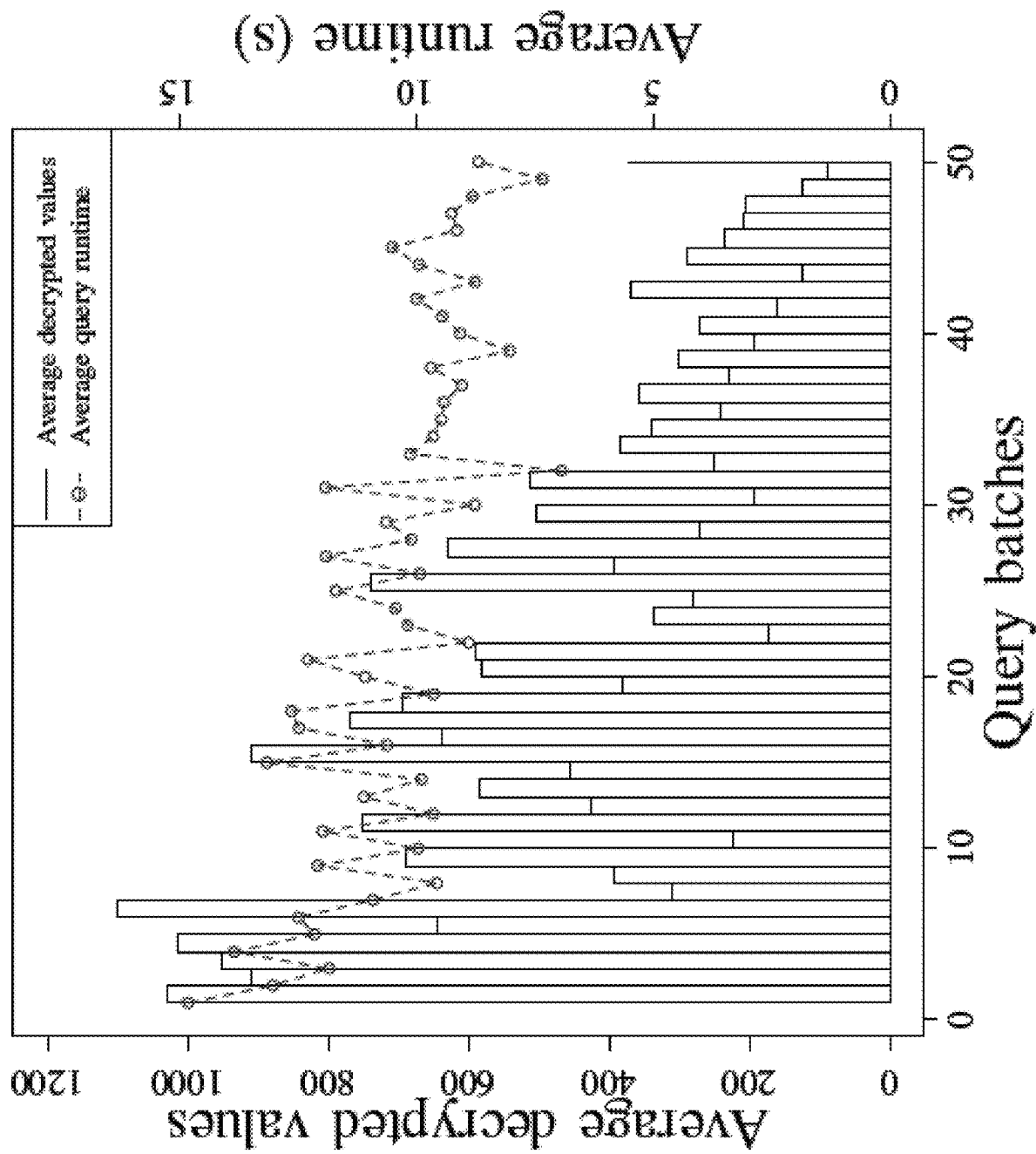
FIG. 9 plots average decrypted values and average runtimes for a trace with 100+ join queries separated in batches of multiple queries according to an example.

The results of executing a trace with 10^3 join operations (with the server acting as previously specified), can be seen in FIG. 9. There, for the sake of readability, we took the average runtime results from every 20 consecutive join queries (also referred to as "batch") and plotted them in dashed lines. Whereas, the stair steps in FIG. 9 represent the averaged number of ABE-values that needed to be decrypted per join batch. As we can see, in time (implicit in the x-axis) both plots tend to sink, since the queries will increasingly need to ABE-decrypt less values which, in turn, results in a lower average query runtime.

Figure 10:
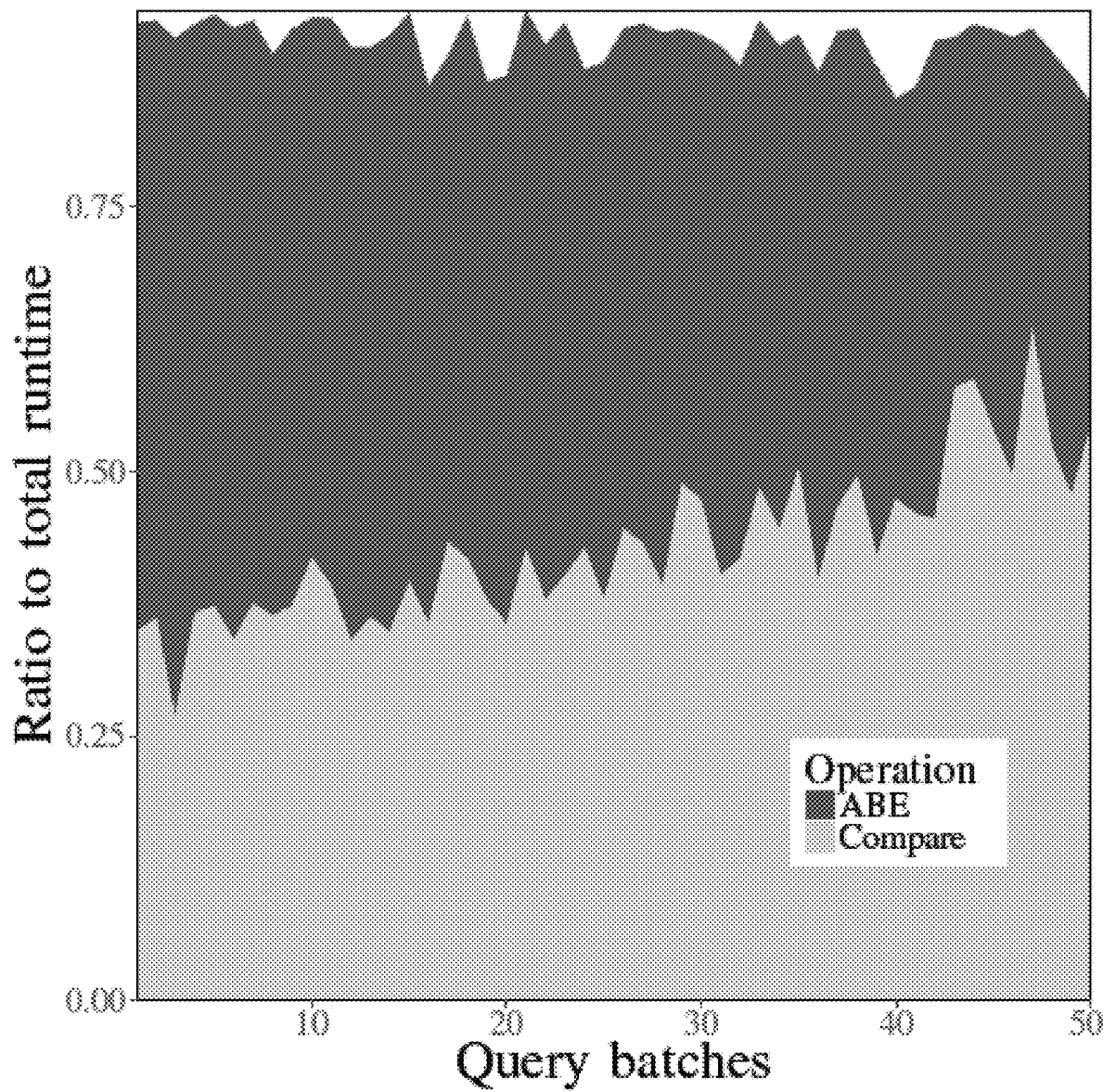
FIG. 10 plots average ratios of time spent by a query in ABE and SSE-operations to the total runtime of the query according to an example.

Since the impact of ABE lessens in time, the dominating factor in later sets of queries (i.e. queries executed towards the end of the trace) is the number of necessary SSE-comparisons. This can be explicitly observed in FIG. 10, which depicts (as before, averaged per batch) the ratios of the time invested by a single join query in executing ABE and SSE operations, compared to the operation's total runtime.

As we can see, when starting the trace's execution, a join query invests close to 30% of its execution time on SSE-comparisons, and most of the rest is spent in ABE operations. This is contrasted with queries in later stages of the trace, where SSE comparisons take up more than 50% of the execution time, with some up to 60%. Since SSE-operations are much more efficient than ABE-operations, this results in lower runtimes for the queries executed later in the trace.

It is noted that embodiments of implementing secure join operations may offer certain benefits over conventional approaches. In particular, such conventional approaches may employ deterministic encryption that is vulnerable to attacks like frequency analysis.

Moreover, conventional approaches may leak the complete inner join result. This is true, notwithstanding the fact that data queries for common applications often comprise additional data constraints (e.g., expressed by additional WHERE clauses in SQL).

Figure 11:
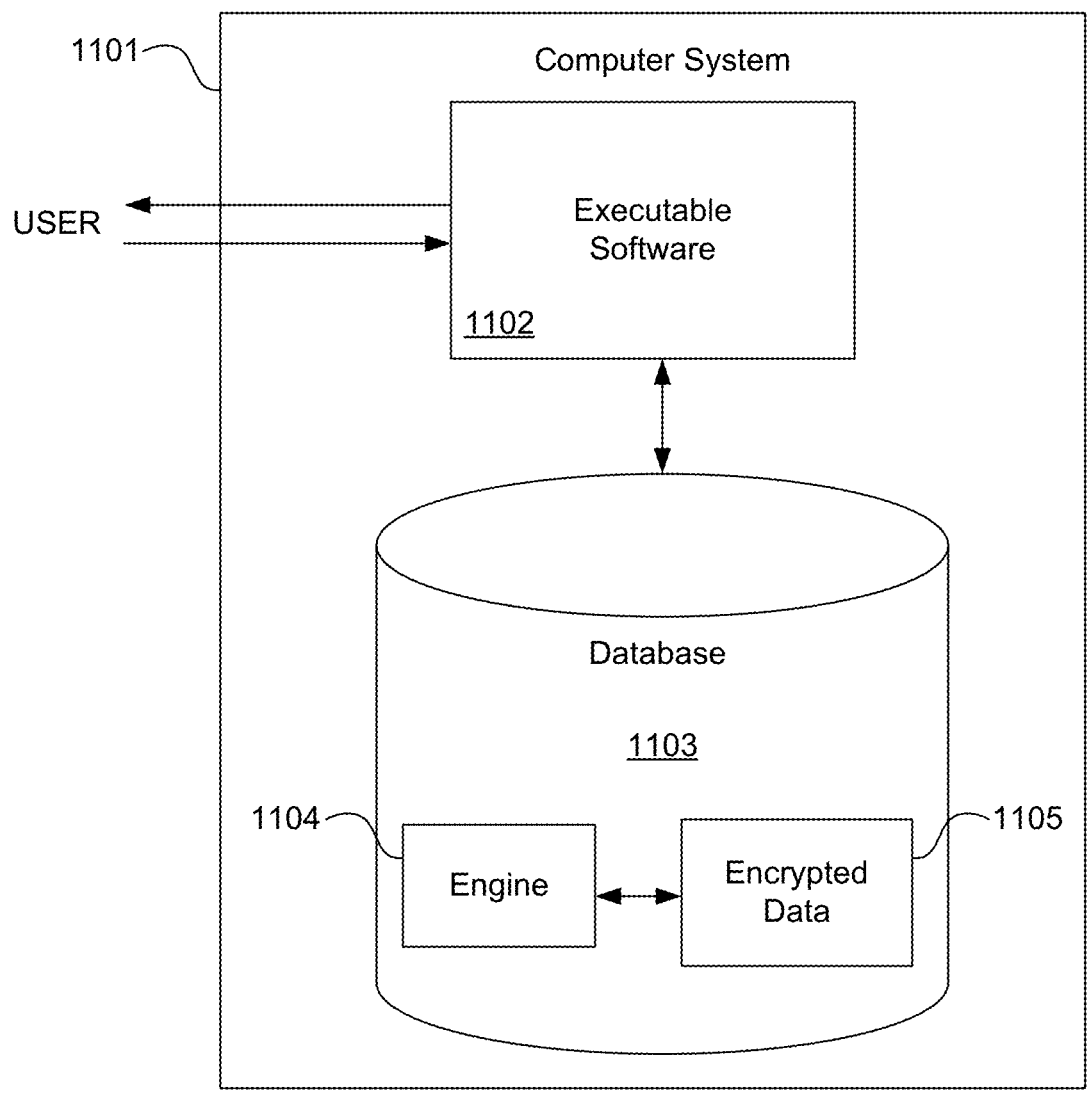
FIG. 11 illustrates hardware of a special purpose computing machine according to an embodiment that is configured to perform encrypted join operations.

Certain embodiments may be implemented in connection with an in-memory database, with the in-memory database engine performing one or more of calculations involving cryptographic operations and other functions performed on the server. FIG. 11 illustrates hardware of a special purpose computing machine configured to implement encrypted database joins according to an embodiment. In particular, computer system 1101 comprises a processor 1102 that is in electronic communication with a non-transitory computer-readable storage medium comprising a database 1103. This computer-readable storage medium has stored thereon code 1105 corresponding to encrypted table data. Code 1104 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In conclusion, embodiments present an approach for performing cryptographically protected database joins with fine granular security. Conventional schemes typically only provide all-or-nothing security.

By contrast, embodiments as described herein provide full flexibility and advanced protection. Most join queries on databases contain additional filtering predicates, with conventional secure join approaches unveiling the complete inner-join result and thereby leaking unnecessary information.

In contrast, by taking the additional filtering process into consideration already during the encryption phase, embodiments minimize the information leakage of the join operation by only unveiling the join values actually involved in the computation of the join's result set.

Embodiments are based on a combination of searchable symmetric encryption and key-policy attribute-based encryption, both applied as generic black boxes. Embodiments may thus benefit from improvements in these areas. Further, a formal security analysis is presented, and the practical feasibility is demonstrated by a prototypical implementation in a real system based on MySQL and Java.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a server storing in a database, a first encrypted table and a second encrypted table encrypted according to a non-deterministic and searchable first encryption scheme;
   the server receiving from a client, a join token based upon a query including a join operation and a predicate attribute constraint;
   an engine of the server, prior to joining the first encrypted table and the second encrypted table, separately searching the first encrypted table according to the predicate attribute constraint to reveal only rows of the first encrypted table fulfilling the predicate attribute constraint and searching the second encrypted table according to the predicate attribute constraint to reveal only rows of the second encrypted table fulfilling the predicate attribute constraint, the engine generating an intermediate construction including only rows of the first encrypted table and the second encrypted table fulfilling the predicate attribute constraint, the intermediate construction encrypted according to a different encryption scheme; and
   the server communicating to the client, the rows of the first encrypted table and the second encrypted table fulfilling the predicate attribute constraint.

2. A method as in claim 1 wherein the non-deterministic and searchable encryption scheme is randomized.

3. A method as in claim 2 wherein the non-deterministic and searchable encryption scheme comprises Symmetric Searchable Encryption (SSE).

4. A method as in claim 1 wherein the join token reflects the constraint expressed in a WHERE clause of the query.

5. A method as in claim 1 wherein the another encryption scheme comprises attribute based encryption.

6. A method as in claim 5 wherein the attribute based encryption comprises Key-Policy Attribute-Based Encryption (KP-ABE).

7. A method as in claim 1 wherein the first encrypted table and the second encrypted table are outsourced to the server from the client.

8. A method as in claim 1 wherein the first encrypted table and the second encrypted table are outsourced to the server from other than the client.

9. A method as in claim 1 wherein database comprises an in-memory database, and the engine comprises an in-memory database engine.

10. A non-transitory computer readable storage medium embodying a computer program for performing a method, said method comprising:
- a server storing in an in-memory database, a first encrypted table and a second encrypted table encrypted according to a non-deterministic and searchable first encryption scheme;
- the server receiving from a client, a join token based upon a query including a join operation and a predicate attribute constraint;
- an in-memory database engine of the server, prior to joining the first encrypted table and the second encrypted table, separately searching the first encrypted table according to the predicate attribute constraint to reveal only rows of the first encrypted table fulfilling the predicate attribute constraint and searching the second encrypted table according to the predicate attribute constraint to reveal only rows of the second encrypted table fulfilling the predicate attribute constraint, the engine generating an intermediate construction including only rows of the first encrypted table and the second encrypted table fulfilling the predicate attribute constraint, the intermediate construction encrypted according to a different encryption scheme; and
- the server communicating to the client, the rows of the first encrypted table and the second encrypted table fulfilling the predicate attribute constraint.

11. A non-transitory computer readable storage medium as in claim 10 wherein the non-deterministic and searchable encryption scheme comprises Symmetric Searchable Encryption (SSE).

12. A non-transitory computer readable storage medium as in claim 10 wherein the another encryption scheme comprises attribute based encryption.

13. A non-transitory computer readable storage medium as in claim 12 wherein the attribute based encryption comprises Key-Policy Attribute-Based Encryption (KP-ABE).

14. A non-transitory computer readable storage medium as in claim 10 wherein the first encrypted table and the second encrypted table are outsourced to the server from other than the client.

15. A non-transitory computer readable storage medium as in claim 10 wherein join token reflects the constraint expressed in a WHERE clause of the query.

16. A computer system comprising:
- one or more processors;
- a software program, stored in memory, executed on said computer system, the software program configured to cause an in-memory database engine to:
- store in an in-memory database, a first encrypted table and a second encrypted table encrypted according to a non-deterministic and searchable first encryption scheme; receive from a client, a join token based upon a query including a join operation and a predicate attribute constraint; search, prior to joining the first encrypted table and the second encrypted table, the first encrypted table according to the predicate attribute constraint to reveal only rows of the first encrypted table fulfilling the predicate attribute constraint, and separately search the second encrypted table according to the predicate attribute to reveal only rows of the second encrypted table fulfilling the predicate attribute constraint, and generate an intermediate construction including only rows of the first encrypted table and the second encrypted table fulfilling the predicate attribute constraint, the intermediate construction encrypted according to a different encryption scheme; and communicate to the client, the rows of the first encrypted table and the second encrypted table fulfilling the predicate attribute constraint.

17. A computer system as in claim 16 wherein the non-deterministic and searchable encryption scheme comprises Symmetric Searchable Encryption (SSE).

18. A computer system as in claim 16 wherein the another encryption scheme comprises Key-Policy Attribute-Based Encryption (KP-ABE).

19. A computer system as in claim 16 wherein the join token reflects the constraint expressed in a WHERE clause of the query.

20. A computer system as in claim 16 wherein the first encrypted table and the second encrypted table are received from other than the client.

* * * * *